US011838230B2

(12) United States Patent
Damnjanovic et al.

(10) Patent No.: US 11,838,230 B2
(45) Date of Patent: Dec. 5, 2023

(54) ACCESS POINT ASSISTED SIDELINK COMMUNICATIONS

(71) Applicant: QUALCOMM Incorporated, San Diego, CA (US)

(72) Inventors: Aleksandar Damnjanovic, Del Mar, CA (US); Xiaoxia Zhang, San Diego, CA (US); Jing Sun, San Diego, CA (US); Yisheng Xue, San Diego, CA (US); Tao Luo, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 25 days.

(21) Appl. No.: 17/143,982

(22) Filed: Jan. 7, 2021

(65) Prior Publication Data

US 2022/0216962 A1  Jul. 7, 2022

(51) Int. Cl.
 *H04L 5/00* (2006.01)
 *H04W 76/14* (2018.01)
 (Continued)

(52) U.S. Cl.
 CPC ........... *H04L 5/0048* (2013.01); *H04W 16/14* (2013.01); *H04W 52/228* (2013.01); *H04W 72/23* (2023.01); *H04W 76/14* (2018.02)

(58) Field of Classification Search
 CPC .... H04L 5/0048; H04W 76/14; H04W 16/14; H04W 52/228; H04W 72/042
 See application file for complete search history.

(56) References Cited

U.S. PATENT DOCUMENTS 11,197,249 B2 * 12/2021 Akkarakaran ........ H04W 4/029
2014/0044024 A1 * 2/2014 Zou ..................... H04W 72/042
(Continued)

FOREIGN PATENT DOCUMENTS

WO   WO-2014025739 A1   2/2014

OTHER PUBLICATIONS

International Search Report and Written Opinion—PCT/US2021/072010—ISA/EPO—dated Apr. 26, 2022.
(Continued)

*Primary Examiner* — Ronald B Abelson
(74) *Attorney, Agent, or Firm* — Holland & Hart/Qualcomm

(57) ABSTRACT

Methods, systems, and devices for wireless communications are described. An access point (AP) may configure power parameters for sidelink communications between user equipments (UEs). The power parameters may be configured based on the UEs operating within an AP service area. In some examples, an AP may transmit one or more signals to the first UE, and the first UE may determine the power parameters based on receiving the signals. Additionally or alternatively, the first UE may be configured to transmit one or more reference signals to the AP, and the AP may configure the power parameters based on receiving the reference signals. The first AP may indicate the power parameters in a sidelink configuration transmitted to the first UE. The first UE may communicate with the second UE on a sidelink channel in accordance with the sidelink configuration, which may improve efficiency and reliability of the sidelink communications.

19 Claims, 19 Drawing Sheets

(51) Int. Cl.
*H04W 16/14* (2009.01)
*H04W 52/22* (2009.01)
*H04W 72/10* (2009.01)
*H04W 72/23* (2023.01)

(56) References Cited

U.S. PATENT DOCUMENTS

| | | | |
|---|---|---|---|
| 2015/0327183 A1 | 11/2015 | Park | |
| 2017/0230919 A1* | 8/2017 | Siomina | H04W 52/346 |
| 2018/0077518 A1* | 3/2018 | Nguyen | G08G 1/096791 |
| 2019/0173612 A1* | 6/2019 | Kimura | H04L 1/0063 |
| 2020/0022089 A1 | 1/2020 | Guo | |
| 2020/0035248 A1* | 1/2020 | Torfs | G10L 25/51 |
| 2020/0260386 A1* | 8/2020 | Ryu | H04W 76/14 |
| 2020/0389761 A1* | 12/2020 | Rao | H04W 4/40 |
| 2020/0396747 A1* | 12/2020 | Lee | H04W 72/08 |
| 2020/0413393 A1* | 12/2020 | Luo | H04W 76/23 |
| 2021/0058856 A1* | 2/2021 | Qi | H04W 48/16 |
| 2021/0266847 A1* | 8/2021 | Cariou | H04W 52/346 |
| 2022/0030523 A1* | 1/2022 | Wang | H04W 52/241 |
| 2022/0109983 A1* | 4/2022 | Barkam | H04W 4/029 |
| 2022/0141681 A1* | 5/2022 | Flesch | H04W 4/029 |
| 2022/0159626 A1* | 5/2022 | Yeo | H04W 72/02 |
| 2023/0047834 A1* | 2/2023 | Mao | B25J 13/089 |

OTHER PUBLICATIONS

"3rd Generation Partnership Project, Technical Specification Group Radio Access Network, Feasibility Study on 6 GHz for LTE and NR in Licensed and Unlicensed Operations (Release 17)", 3GPP Draft, 3GPP TR 37.890 V0.10.0 (Dec. 2020), RP-202273, 3rd Generation Partnership Project (3GPP), Mobile Competence Centre, 650, Route Des Lucioles, F-06921 Sophia-Antipolis Cedex, France, Dec. 11, 2020 (Dec. 11, 2020), XP051966493, 23 Pages, Retrieved from the Internet: URL: https://ftp.3gpp.org/tsg_ran/TSG_RAN/TSGR_90e/Docs/RP-202273.zip RP-202273_TR37.890 Feasibility Study on 6 GHz_cl.docx. [Retrieved on Dec. 11, 2020] Paragraph 4.1.1.3.1b paragraph 4.1.1.3.1c.

Partial International Search Report—PCT/US2021/072010—ISA/EPO—dated Mar. 4, 2022.

* cited by examiner

ACCESS POINT ASSISTED SIDELINK COMMUNICATIONS

FIELD OF TECHNOLOGY

The following relates to wireless communications, including access point assisted sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A first UE may be configured to communicate with a second UE using sidelink communications. However, for some use cases, sidelink communications may be limited. Reducing the limitations or improving the opportunities for sidelink communications may be beneficial.

SUMMARY

The described techniques relate to improved methods, systems, devices, and apparatuses that support access point assisted sidelink communications. Generally, the described techniques provide for enabling an access point (AP) to configure power parameters for sidelink communications between user equipments (UEs), including sidelink communications for UEs operating in a low power indoor (LPI) mode. The power parameters may be configured based on the UEs operating within an AP service area. In some examples, a first UE and a second UE may operate within a service area of a first AP. Additionally or alternatively, the second UE may operate within a service area of a second AP different from the first AP. In some examples, the first AP may transmit one or more signals (e.g., an anchor signal a synchronization signal block (SSB), a reference signal, or another signal, or any combination thereof) to the first UE, and the first UE may determine the power parameters based on receiving the signals (e.g., based on a reference signal receive power (RSRP) of the received signals). Additionally or alternatively, the first UE may be configured to transmit one or more reference signals (e.g., a sounding reference signal (SRS)) to the first AP, and the first AP may configure the power parameters based on receiving the reference signals. The first AP may indicate the power parameters in a sidelink configuration transmitted to the first UE. The sidelink configuration may indicate limits (e.g., a maximum) for one or more power parameters (such as a power spectral density (PSD), an equivalent isotropic radiated power (EIRP), etc.) of the sidelink communications. The first UE may communicate with the second UE on a sidelink channel in accordance with the sidelink configuration, which may improve efficiency and reliability of the sidelink communications, among other benefits.

A method for wireless communications at a first user equipment (UE) is described. The method may include receiving, from a first access point on a first channel, a sidelink configuration for sidelink communications with a second UE on a second channel, where the sidelink configuration is provided to the first UE based on both the first UE and the second UE being in communication with an access point, determining one or more power parameters from the sidelink configuration, the one or more power parameters being for the sidelink communications and being based on signaling on the first channel, and communicating with the second UE on the second channel in accordance with the sidelink configuration.

An apparatus for wireless communications at a first UE is described. The apparatus may include a processor, memory in electronic communication with the processor, and instructions stored in the memory. The instructions may be executable by the processor to cause the apparatus to receive, from a first access point on a first channel, a sidelink configuration for sidelink communications with a second UE on a second channel, where the sidelink configuration is provided to the first UE based on both the first UE and the second UE being in communication with an access point, determine one or more power parameters from the sidelink configuration, the one or more power parameters being for the sidelink communications and being based on signaling on the first channel, and communicate with the second UE on the second channel in accordance with the sidelink configuration.

Another apparatus for wireless communications at a first UE is described. The apparatus may include means for receiving, from a first access point on a first channel, a sidelink configuration for sidelink communications with a second UE on a second channel, where the sidelink configuration is provided to the first UE based on both the first UE and the second UE being in communication with an access point, means for determining one or more power parameters from the sidelink configuration, the one or more power parameters being for the sidelink communications and being based on signaling on the first channel, and means for communicating with the second UE on the second channel in accordance with the sidelink configuration.

A non-transitory computer-readable medium storing code for wireless communications at a first UE is described. The code may include instructions executable by a processor to receive, from a first access point on a first channel, a sidelink configuration for sidelink communications with a second UE on a second channel, where the sidelink configuration is provided to the first UE based on both the first UE and the second UE being in communication with an access point, determine one or more power parameters from the sidelink configuration, the one or more power parameters being for the sidelink communications and being based on signaling on the first channel, and communicate with the second UE on the second channel in accordance with the sidelink configuration.

Some examples of the method, apparatuses, and non-transitory computer-readable medium described herein may further include operations, features, means, or instructions for receiving one or more signals from the first access point, where the sidelink configuration may be received based on receiving the one or more signals, and where the signaling on the first channel includes the one or more signals.

In some examples of the method, apparatuses, and non-transitory computer-readable medium described herein, the one or more signals include an anchor signal, a synchronization signal block, a reference signal, or any combination thereof.

Some examples of the method, apparatuses, and non-transitory computer-readable medium described herein may further include operations, features, means, or instructions for transmitting one or more reference signals to the first access point, where the sidelink configuration may be received based on transmitting the one or more reference signals, and where the signaling on the first channel includes the one or more reference signals.

Some examples of the method, apparatuses, and non-transitory computer-readable medium described herein may further include operations, features, means, or instructions for determining a first operation mode for communications with the first access point and a second operation mode for the sidelink communications, where communicating with the second UE on the second channel may be in accordance with the second operation mode.

In some examples of the method, apparatuses, and non-transitory computer-readable medium described herein, each of the first operation mode and the second operation mode includes a standard power mode or a low power indoor mode.

In some examples of the method, apparatuses, and non-transitory computer-readable medium described herein, the one or more power parameters include a power spectral density of the sidelink communications, an equivalent isotropic radiated power of the sidelink communications, or both.

In some examples of the method, apparatuses, and non-transitory computer-readable medium described herein, the first channel and the second channel include a same channel.

In some examples of the method, apparatuses, and non-transitory computer-readable medium described herein, the first channel may be different from the second channel.

In some examples of the method, apparatuses, and non-transitory computer-readable medium described herein, the first channel and the second channel may be in a same radio frequency spectrum band.

In some examples of the method, apparatuses, and non-transitory computer-readable medium described herein, the first channel may be in a first radio frequency spectrum band and the second channel may be in a second radio frequency spectrum band.

A method for wireless communications at a first access point is described. The method may include determining one or more power parameters for sidelink communications between a first UE and a second UE, the one or more power parameters based on signaling on a first channel and transmitting, to the first UE on the first channel, a sidelink configuration for the sidelink communications on a second channel, where the sidelink configuration is provided to the first UE based on both the first UE and the second UE being in communication with an access point.

An apparatus for wireless communications at a first access point is described. The apparatus may include a processor, memory in electronic communication with the processor, and instructions stored in the memory. The instructions may be executable by the processor to cause the apparatus to determine one or more power parameters for sidelink communications between a first UE and a second UE, the one or more power parameters based on signaling on a first channel and transmit, to the first UE on the first channel, a sidelink configuration for the sidelink communications on a second channel, where the sidelink configuration is provided to the first UE based on both the first UE and the second UE being in communication with an access point.

Another apparatus for wireless communications at a first access point is described. The apparatus may include means for determining one or more power parameters for sidelink communications between a first UE and a second UE, the one or more power parameters based on signaling on a first channel and means for transmitting, to the first UE on the first channel, a sidelink configuration for the sidelink communications on a second channel, where the sidelink configuration is provided to the first UE based on both the first UE and the second UE being in communication with an access point.

A non-transitory computer-readable medium storing code for wireless communications at a first access point is described. The code may include instructions executable by a processor to determine one or more power parameters for sidelink communications between a first UE and a second UE, the one or more power parameters based on signaling on a first channel and transmit, to the first UE on the first channel, a sidelink configuration for the sidelink communications on a second channel, where the sidelink configuration is provided to the first UE based on both the first UE and the second UE being in communication with an access point.

Some examples of the method, apparatuses, and non-transitory computer-readable medium described herein may further include operations, features, means, or instructions for transmitting one or more signals to the first UE, where the one or more power parameters may be determined based on transmitting the one or more signals, and where the signaling on the first channel includes the one or more signals.

In some examples of the method, apparatuses, and non-transitory computer-readable medium described herein, the one or more signals include an anchor signal, a synchronization signal block, a reference signal, or any combination thereof.

Some examples of the method, apparatuses, and non-transitory computer-readable medium described herein may further include operations, features, means, or instructions for receiving one or more reference signals from the first UE, where the one or more power parameters may be determined based on receiving the one or more reference signals, and where the signaling on the first channel includes the one or more reference signals.

Some examples of the method, apparatuses, and non-transitory computer-readable medium described herein may further include operations, features, means, or instructions for determining a first operation mode for communications with the first UE and a second operation mode for the sidelink communications, where communicating with the first UE on the first channel may be in accordance with the first operation mode.

In some examples of the method, apparatuses, and non-transitory computer-readable medium described herein, each of the first operation mode and the second operation mode includes a standard power mode or a low power indoor mode.

In some examples of the method, apparatuses, and non-transitory computer-readable medium described herein, the one or more power parameters include a power spectral density of the sidelink communications, an equivalent isotropic radiated power of the sidelink communications, or both.

In some examples of the method, apparatuses, and non-transitory computer-readable medium described herein, the first channel and the second channel include a same channel.

In some examples of the method, apparatuses, and non-transitory computer-readable medium described herein, the first channel may be different from the second channel.

In some examples of the method, apparatuses, and non-transitory computer-readable medium described herein, the first channel and the second channel may be in a same radio frequency spectrum band.

In some examples of the method, apparatuses, and non-transitory computer-readable medium described herein, the first channel may be in a first radio frequency spectrum band and the second channel may be in a second radio frequency spectrum band.

A method for wireless communications at a first UE is described. The method may include determining that the first UE is located indoors, determining one or more power parameters for sidelink communications that are facilitated by the first UE being located indoors, and communicating with a second UE via the sidelink communications based on the UE being located indoors and the one or more power parameters.

An apparatus for wireless communications at a first UE is described. The apparatus may include a processor, memory in electronic communication with the processor, and instructions stored in the memory. The instructions may be executable by the processor to cause the apparatus to determine that the first UE is located indoors, determine one or more power parameters for sidelink communications that are facilitated by the first UE being located indoors, and communicate with a second UE via the sidelink communications based on the UE being located indoors and the one or more power parameters.

Another apparatus for wireless communications at a first UE is described. The apparatus may include means for determining that the first UE is located indoors, means for determining one or more power parameters for sidelink communications that are facilitated by the first UE being located indoors, and means for communicating with a second UE via the sidelink communications based on the UE being located indoors and the one or more power parameters.

A non-transitory computer-readable medium storing code for wireless communications at a first UE is described. The code may include instructions executable by a processor to determine that the first UE is located indoors, determine one or more power parameters for sidelink communications that are facilitated by the first UE being located indoors, and communicate with a second UE via the sidelink communications based on the UE being located indoors and the one or more power parameters.

Some examples of the method, apparatuses, and non-transitory computer-readable medium described herein may further include operations, features, means, or instructions for receiving location information associated with the first UE, where determining that the first UE may be located indoors may be based on receiving the location information.

In some examples of the method, apparatuses, and non-transitory computer-readable medium described herein, the location information may be received from one or more sensors, one or more actuators, or any combination thereof.

In some examples of the method, apparatuses, and non-transitory computer-readable medium described herein, the location information includes ultra wideband positioning information, a configuration, a setting, or any combination thereof.

Some examples of the method, apparatuses, and non-transitory computer-readable medium described herein may further include operations, features, means, or instructions for determining an operation mode for the sidelink communications, where communicating with the second UE may be in accordance with the operation mode.

In some examples of the method, apparatuses, and non-transitory computer-readable medium described herein, the operation mode includes a standard power mode or a low power indoor mode.

In some examples of the method, apparatuses, and non-transitory computer-readable medium described herein, the one or more power parameters include a power spectral density of the sidelink communications, an equivalent isotropic radiated power of the sidelink communications, or both.

DETAILED DESCRIPTION

Figure 1:
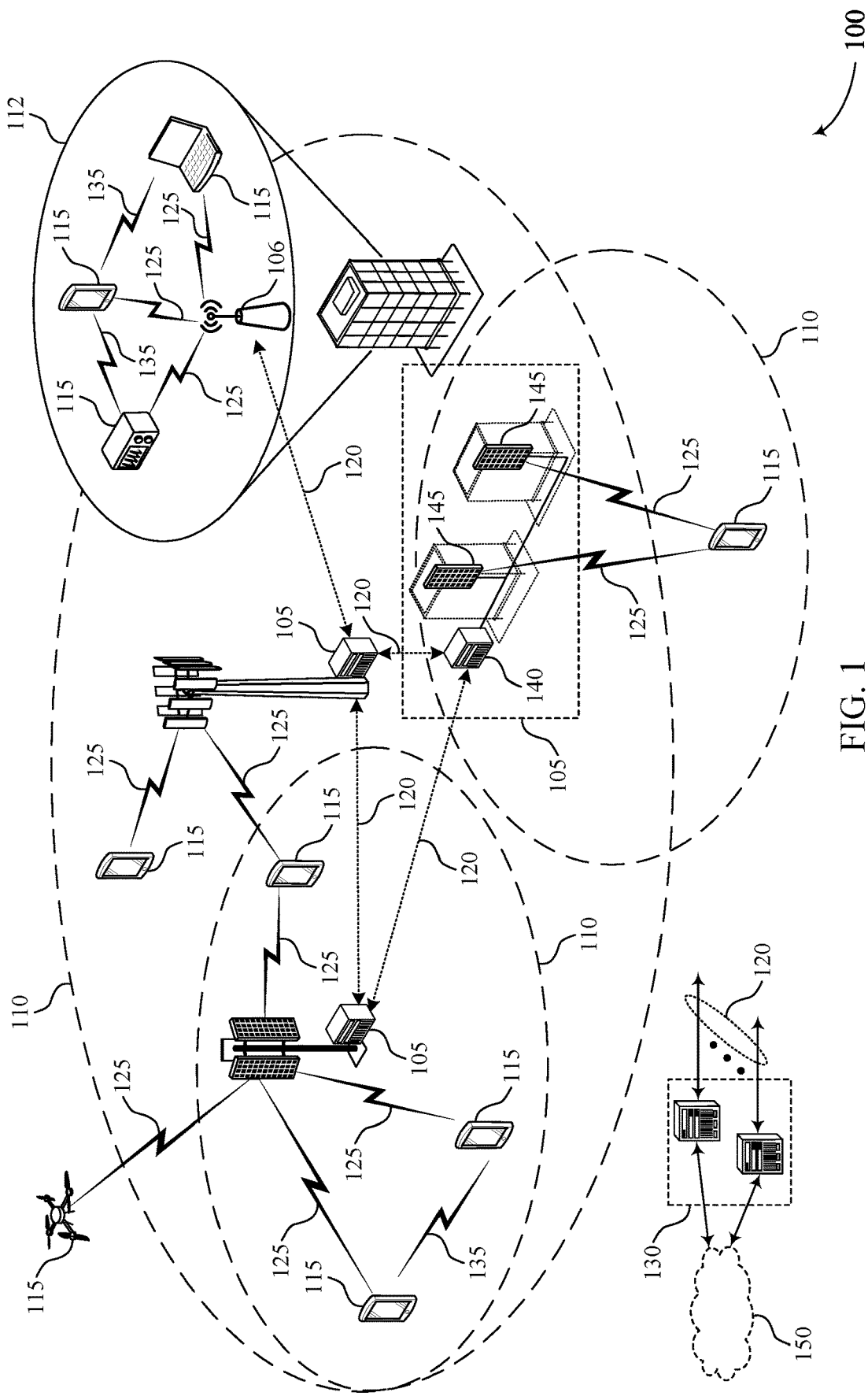
FIG. 1 illustrates an example of a wireless communications system that supports access point assisted sidelink communications in accordance with aspects of the present disclosure.

Some wireless communication systems may include one or more wireless devices that support one or more multiple radio access technologies (RATs) including fourth generation (4G) systems such as Long Term Evolution (LTE)

systems, fifth generation (5G) systems which may be referred to as New Radio (NR) systems, and Wi-Fi systems (e.g., wireless local area network (WLAN) systems). For example, a wireless communications system may include user equipment (UE), base stations, such as next-generation NodeBs or giga-NodeBs (either of which may be referred to as a gNB), integrated access and backhaul (IAB) nodes, repeaters (e.g., smart repeaters, dumb repeaters, radio frequency (RF) repeaters, among other examples), sidelink nodes, relay nodes, etc.

In some wireless communications systems, UEs may be configured to communicate with one another via sidelink communications. In some cases, however, if power parameters (such as power spectral density (PSD), equivalent isotropic radiated power (EIRP), etc.) of the sidelink communications are not limited, transmissions on a sidelink channel may interfere with communications between UEs and a base station, which may be referred to as Uu communications. Accordingly, sidelink communications may be limited in one or more radio frequency spectrum bands (e.g., bands in radio frequencies near 6 gigahertz (GHz)) to reduce interference. For example, in a low power indoor (LPI) mode, UEs may be allowed to participate in sidelink communications while indoors to help ensure that the UE transmission powers are low enough to avoid causing interference. In some cases, there may be concerns about allowing sidelink communications in an LPI mode. For example, sidelink communications may enable a UE to operate outside a service area of an authorized access point (AP), such as via a "daisy chain" of sidelink connections. These concerns may be addressed by ensuring that UEs are in direct communication with an AP. It may thus be beneficial to enable an AP to assist in configuring sidelink communications between UEs.

According to the techniques described herein, an AP may configure power parameters for sidelink communications between UEs, including sidelink communications for UEs operating in an LPI mode. The power parameters may be configured based on the UEs operating within an AP service area. In some examples, a first UE and a second UE may operate within a service area of a first AP. Additionally or alternatively, the second UE may operate within a service area of a second AP different from the first AP. In some examples, the first AP may transmit one or more signals (e.g., an anchor signal, a synchronization signal block (SSB), a reference signal, or another signal, or any combination thereof) to the first UE, and the first UE may determine the power parameters based on receiving the signals (e.g., based on a reference signal receive power (RSRP) of the received signals). Additionally or alternatively, the first UE may be configured to transmit one or more reference signals (e.g., a sounding reference signal (SRS)) to the first AP, and the first AP may configure the power parameters based on receiving the reference signals.

The first AP may indicate the power parameters in a sidelink configuration transmitted to the first UE. The sidelink configuration may indicate limits (e.g., a maximum) for one or more power parameters (such as a PSD, an EIRP, etc.) of the sidelink communications. Additionally or alternatively, the first UE may determine the power parameters based on the UEs being located indoors. The first UE may receive location information (e.g., ultra wideband positioning information, a configuration, a setting, or other location information) indicating the UEs are located indoors. In some examples, the first UE may receive the location information from one or more sensors, one or more actuators, or other mechanisms, or any combination thereof, such as mechanisms associated with indoor factory automation. The first UE may communicate with the second UE on a sidelink channel in accordance with the power parameters, which may improve efficiency and reliability of the sidelink communications, among other benefits.

Aspects of the disclosure are initially described in the context of wireless communications systems. Aspects of the disclosure are further illustrated by and described with reference to process flows, apparatus diagrams, system diagrams, and flowcharts that relate to access point assisted sidelink communications.

FIG. 1 illustrates an example of a wireless communications system 100 that supports access point assisted sidelink communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an AP, a radio transceiver, a NodeB, an eNodeB (eNB), a next-generation NodeB or a giga-NodeB (either of which may be referred to as a gNB), a Home NodeB, a Home eNodeB, or other suitable terminology. Additionally, and in some cases, wireless communications system 100 may include APs 106 that are used for local area network communications within a service area 112.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105, the APs 106, and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. Additionally or alternatively, the UEs 115 and the APs 106 may wirelessly communicate with one another via one or more communication links 125 over a local area network. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105, the APs 106, or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. Similarly, an AP 106 may support communications over a local network in a service area 112, which may be or include a building, a subset of a building, or an area associated with factory automation, among other examples.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a sidelink communication link 135 (e.g., using a client-to-client, peer-to-peer (P2P) or device-to-device (D2D) protocol). One or more UEs 115 utilizing sidelink communications may be within the geographic coverage area 110 of a base station 105 or the service area 112 of an AP 106. Other UEs 115 in such a group may be outside the geographic coverage area 110 of a base station 105 or be otherwise unable to receive transmissions from a base station 105. In some examples, groups of the UEs 115 communicating via sidelink communications may utilize a one-to-many (1:M) system in which each UE 115 transmits to every other UE 115 in the group. In some examples, a base station 105 or an AP 106 facilitates the scheduling of resources for sidelink communications. In other cases, sidelink communications are carried out between the UEs 115 without the involvement of a base station 105 or an AP 106.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105, an AP 106, or a UE 115 may be equipped with multiple antennas, which may be used to employ techniques such as transmit diversity, receive diversity, multiple-input multiple-output (MIMO) communications, or beamforming. The antennas of a base station 105, an AP 106, or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 or an AP 106 may have an antenna array with a number of rows and columns of antenna ports that the base station 105 or the AP 106 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105, the APs 106, or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, an AP 106, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115, the APs 106, and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

According to the techniques described herein, an AP 106 may configure power parameters for sidelink communications between UEs 115 (e.g., via sidelink communications links 135), including sidelink communications for UEs 115 operating in an LPI mode. The power parameters may be configured based on the UEs operating within an AP service area 112. In some examples, a first UE 115 and a second UE 115 may operate within a service area 112 of a first AP 106. Additionally or alternatively, the second UE 115 may operate within a service area 112 of a second AP 106 different from the first AP 106. In some examples, the first AP 106 may transmit one or more signals to the first UE 115, and the first UE 115 may determine the power parameters based on receiving the signals (e.g., based on an RSRP of the received signals). Additionally or alternatively, the first UE 115 may be configured to transmit one or more reference signals to the first AP 106, and the first AP 106 may configure the power parameters based on receiving the reference signals. The first AP 106 may indicate the power parameters in a sidelink configuration transmitted to the first UE 115. The sidelink configuration may indicate limits (e.g., a maximum) for one or more power parameters (such as a PSD, an EIRP, etc.) of the sidelink communications. Additionally or alternatively, the first UE 115 may determine the power parameters based on the UEs 115 being located indoors. For example, the first UE 115 may receive location information indicating the UEs 115 are located indoors. The first UE 115 may communicate with the second UE 115 on a sidelink communications link 135 in accordance with the power parameters, which may improve efficiency and reliability of the sidelink communications, among other benefits.

Figure 2:
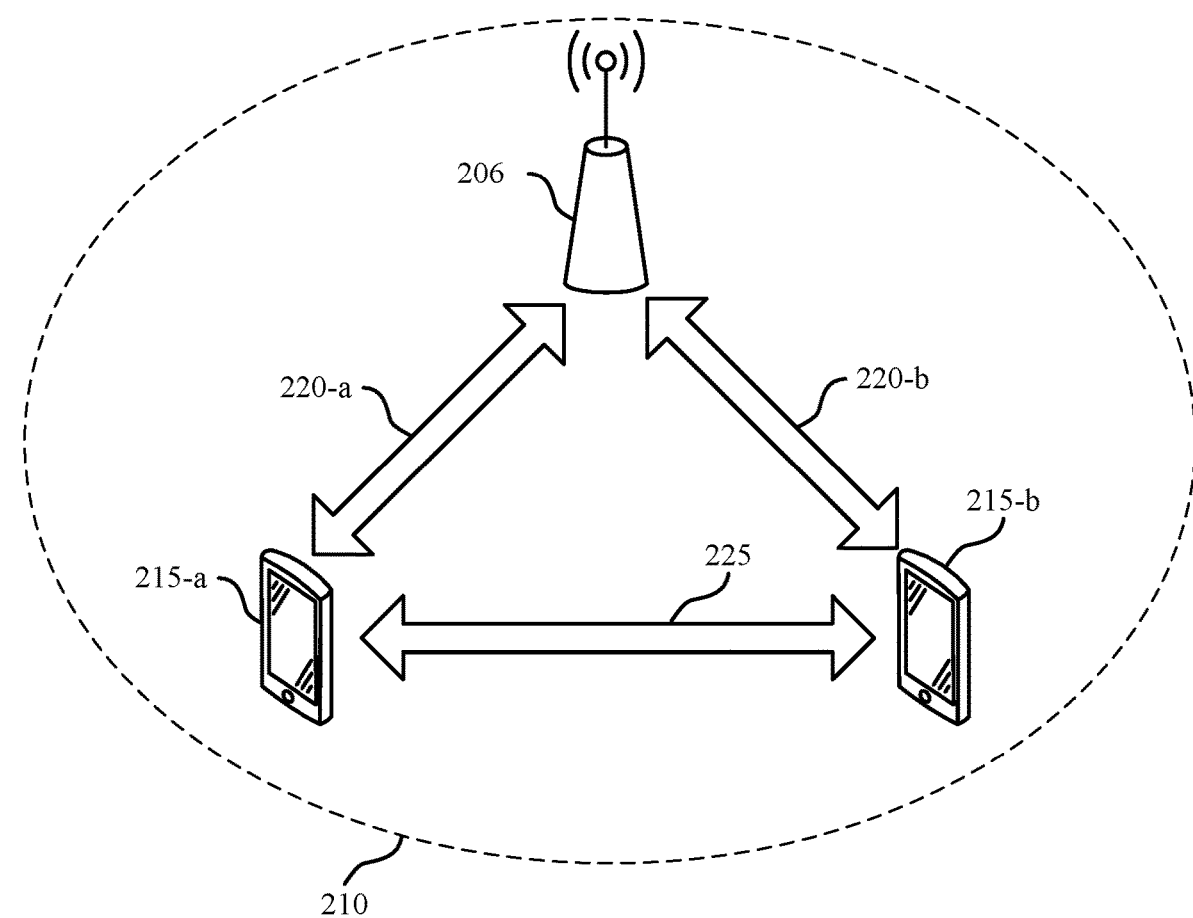
FIG. 2 illustrates an example of a wireless communications system that supports access point assisted sidelink communications in accordance with aspects of the present disclosure.

FIG. 2 illustrates an example of a wireless communications system 200 that supports access point assisted sidelink communications in accordance with aspects of the present disclosure. In some examples, the wireless communications system 200 may implement aspects of the wireless communications system 100. For example, the wireless communications system 200 may include an AP 206 and one or more UEs 215, which may be examples of corresponding devices described with reference to FIG. 1. The wireless communications system 200 may include features for improved sidelink communications between the UEs 215, among other benefits.

The AP 206 may communicate with the UEs 215 via channels 220, each of which may be referred to as a Uu interface. For example, the AP 206 may communicate with a UE 215-*a* via a channel 220-*a* and with a UE 215-*b* via a channel 220-*b*. In some examples, the channels 220 may be located in a radio frequency spectrum band such as an Unlicensed National Information Infrastructure (U-NII) radio frequency spectrum band with a carrier frequency near 6 GHz (e.g., a U-NII-4 band, a U-NII-5 band, a U-NII-6 band, a U-NII-7 band, a U-NII-8 band, or another radio frequency spectrum band). The AP 206 may communicate with the UEs 215 via the channels 220 according to a configured operation mode (which may also be referred to as a regulation mode), such as a standard power mode, an LPI mode, a very low power (VLP) mode, etc.

The UE 215-*a* and the UE 215-*b* may operate within a service area 210 of the AP 206. The UEs 215 may be configured to communicate via a sidelink channel 225 according to an operation mode. The operation mode for sidelink communications via the sidelink channel 225 may be a same operation mode as the configured operation mode for the communications via the channels 220, or a different operation mode. In some cases, however, if power parameters (such as a PSD, an EIRP, etc.) of the sidelink communications are not limited, transmissions on the sidelink channel 225 may interfere with communications between the AP 206 and the UEs 215 on the channels 220. In some cases, there may also be concerns about allowing sidelink communications between the UEs 215 in an LPI mode. For example, sidelink communications may enable a UE 215 to operate outside the service area 210 of the AP 206, such as via a "daisy chain" of sidelink connections. These concerns may be addressed by ensuring that UEs 215 are in direct communication with the AP 206 (e.g., via a channel 220). It may thus be beneficial to enable the AP 206 to assist in configuring sidelink communications between the UEs 215.

According to the techniques described herein, the AP 206 may configure power parameters for sidelink communications between the UEs 215 on the sidelink channel 225. The power parameters may be configured based on the UEs 215 operating within the service area 210 of the AP 206. In some examples, the power parameters may be configured based on the channel 220-*a*, the channel 220-*b*, and the sidelink channel 225 being a same channel, which may be referred to as a channel 0. In some examples, the power parameters may be configured based on a first operation mode for the communications via the channels 220, a second operation mode for the sidelink communications via the sidelink channel 225, or both.

In some examples, the AP 206 may transmit one or more signals (e.g., an anchor signal, an SSB, a reference signal, or another signal, or any combination thereof) to the UE 215-*a*, and the UE 215-*a* may determine the power parameters based on receiving the signals (e.g., based on an RSRP of the received signals). Additionally or alternatively, the UE 215-*a* may be configured to transmit one or more reference signals (e.g., an SRS) to the AP 206, and the AP 206 may configure the power parameters based on receiving the reference signals.

The AP 206 may indicate the power parameters in a sidelink configuration transmitted to the UE 215-*a*. The sidelink configuration may indicate limits (e.g., a maximum) for one or more power parameters (such as a PSD, an EIRP, etc.) of the sidelink communications. Additionally or alternatively, the UE 215-*a* may determine the power parameters based on the UEs 215 being located indoors. The UE 215-*a* may receive location information indicating the UEs 215 are located indoors. In some examples, the UE 215-*a* may receive the location information from one or more mechanisms associated with indoor factory automation. The UE 215-*a* may communicate with the UE 215-*b* via the sidelink channel 225 in accordance with the power parameters, which may improve efficiency and reliability of sidelink communications, among other benefits.

Figure 3:
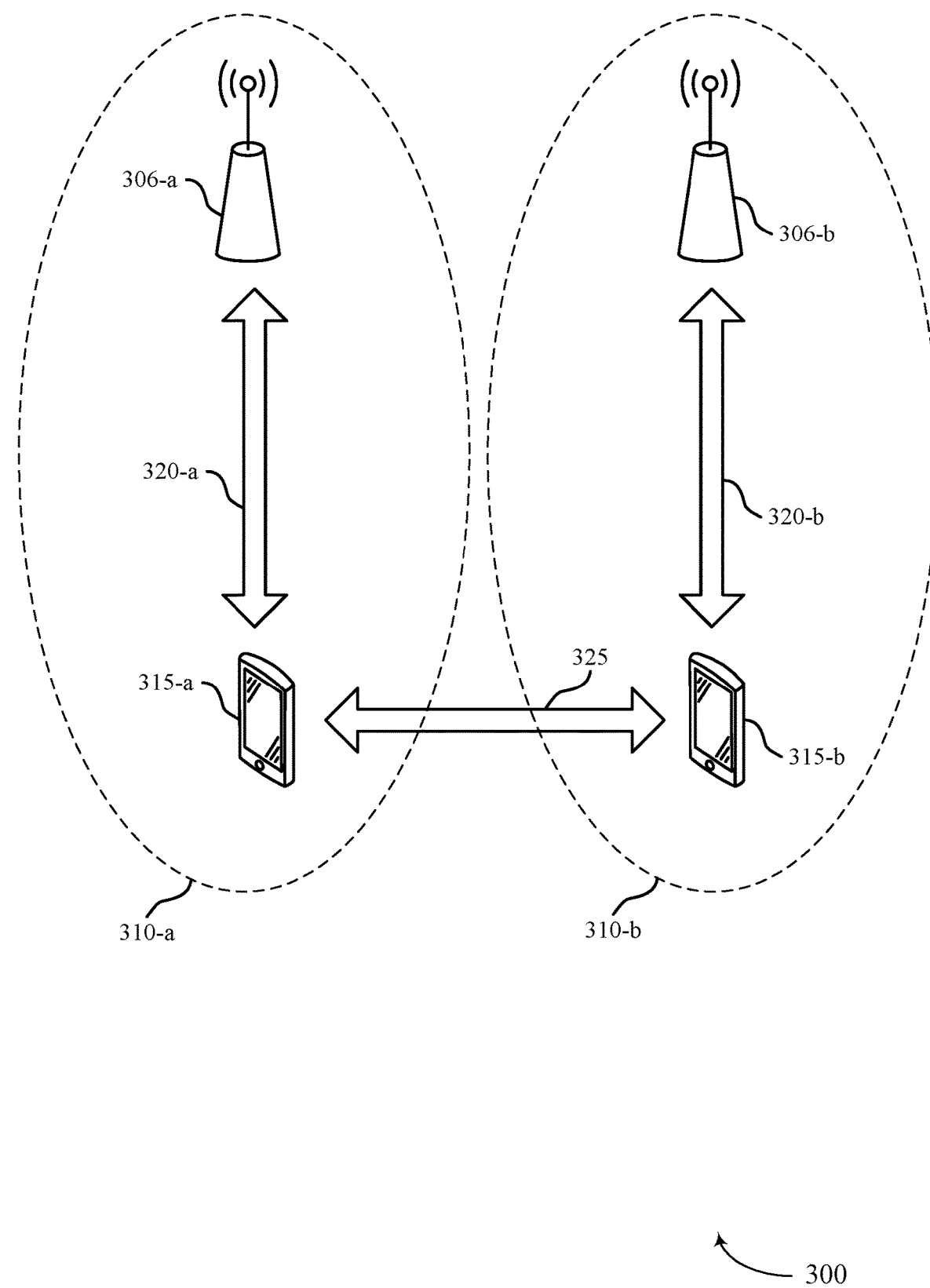
FIG. 3 illustrates an example of a wireless communications system that supports access point assisted sidelink communications in accordance with aspects of the present disclosure.

FIG. 3 illustrates an example of a wireless communications system 300 that supports access point assisted sidelink communications in accordance with aspects of the present disclosure. In some examples, the wireless communications system 300 may implement aspects of the wireless communications system 100. For example, the wireless communications system 300 may include one or more APs 306 and one or more UEs 315, which may be examples of corresponding devices described with reference to FIG. 1. The wireless communications system 300 may include features for improved sidelink communications between the UEs 315, among other benefits.

The APs 306 may communicate with the UEs 315 via channels 320, each of which may be referred to as a Uu interface. For example, an AP 306-*a* may communicate with a UE 315-*a* via a channel 320-*a*, and an AP 306-*b* may communicate with a UE 315-*b* via a channel 320-*b*. In some examples, the channels 320 may be in a radio frequency spectrum band such as a U-NII radio frequency spectrum band with a carrier frequency near 6 GHz. Each AP 306 may communicate with UEs 315 via the channels 320 according to a respective configured operation mode, such as a standard power mode, an LPI mode, a VLP mode, etc. A first operation mode associated with the AP 306-*a* and a second operation mode associated with the AP 306-*b* may be a same operation mode or different operation modes.

The UE 315-*a* and the UE 315-*b* may each operate within a service area 310 of an AP 306. As illustrated in FIG. 3, the UE 315-*a* may operate within a service area 310-*a* of the AP 306-*a*, and the UE 315-*b* may operate within a service area 310-*b* of the AP 306-*b*. The UEs 315 may be configured to communicate via a sidelink channel 325 according to a third operation mode. The third operation mode for sidelink communications via the sidelink channel 325 may be a same operation mode as the first or second operation modes for the communications via the channels 320, or a different operation mode. In some cases, however, if power parameters (such as a PSD, an EIRP, etc.) of sidelink communications are not limited, transmissions on the sidelink channel 325 may interfere with communications between the APs 306 and the UEs 315 on the channels 320. In some cases, there may also be concerns about allowing sidelink communications between the UEs 315 in an LPI mode. For example, sidelink communications may enable a UE 315 to operate outside a service area 310 of an AP 306, such as via a "daisy chain" of sidelink connections. These concerns may be addressed by ensuring that UEs 315 are in direct communication with an AP 306 (e.g., via a channel 320). It may thus be beneficial to enable the APs 306 to assist in configuring sidelink communications between the UEs 315.

According to the techniques described herein, the APs 306 may configure power parameters for sidelink communications between the UEs 315 on the sidelink channel 325. The power parameters may be configured based on the UEs 315 operating within a service area 310 of an AP 306. In some examples, the power parameters may be configured based on the first operation mode for the communications via the channel 320-*a*, the second operation mode for the communications via the channel 320-*b*, the third operation mode for the sidelink communications via the sidelink channel 325, or any combination thereof.

In some examples, the power parameters may be configured based on the channel 220-*a*, the channel 220-*b*, the sidelink channel 225, and the radio frequency spectrum band (or bands) that includes the channel 220-*a*, the channel 220-*b*, and the sidelink channel 225. In some examples, the channel 320-*a*, the channel 320-*b*, and the sidelink channel 325 may be a same channel, which may be referred to as a channel 0. In some examples, the channel 320-*a*, the channel 320-*b*, and the sidelink channel 325 being different channels. For example, the channel 320-*a* may be the channel 0, the channel 320-*b* may be a channel 1, and the sidelink channel 325 may be a channel 2. In some examples, the channel 320-*a*, the channel 320-*b*, and the sidelink channel 325 may be in a same radio frequency spectrum band (e.g., a U-NII band). In some examples, the channel 320-*a*, the channel 320-*b*, and the sidelink channel 325 may be in different radio frequency spectrum bands.

In some examples, the AP 306-*a* may transmit one or more signals (e.g., an anchor signal, an SSB, a reference signal, or another signal, or any combination thereof) to the UE 315-*a*, and the UE 315-*a* may determine the power parameters based on receiving the signals (e.g., based on an RSRP of the received signals). Additionally or alternatively, the UE 315-*b* may determine the power parameters based on receiving signals from the AP 306-*b*. In some examples, the UE 315-*a* may be configured to transmit one or more reference signals (e.g., an SRS) to the AP 306-*a*, and the AP 306-*a* may configure the power parameters based on receiving the reference signals. Additionally or alternatively, the AP 306-*b* may configure the power parameters based on receiving reference signals from the UE 315-*b*.

The AP 306-*a* may indicate the power parameters in a sidelink configuration transmitted to the UE 315-*a*. The sidelink configuration may indicate limits (e.g., a maximum) for one or more power parameters (such as a PSD, an EIRP, etc.) of the sidelink communications. Additionally or alternatively, the UE 315-*a* may determine the power parameters based on the UEs 315 being located indoors. The UE 315-*a* may receive location information indicating the UEs 315 are located indoors. In some examples, the UE 315-*a* may receive the location information from one or more mechanisms associated with indoor factory automation. Additionally or alternatively, the UE 315-*b* may determine the power parameters based on a sidelink configuration from the AP 306-*b*, or based on the UEs 315 being located indoors. The UE 315-*a* may communicate with the UE 315-*b* via the sidelink channel 325 in accordance with the power parameters, which may improve efficiency and reliability of sidelink communications, among other benefits.

Figure 4:
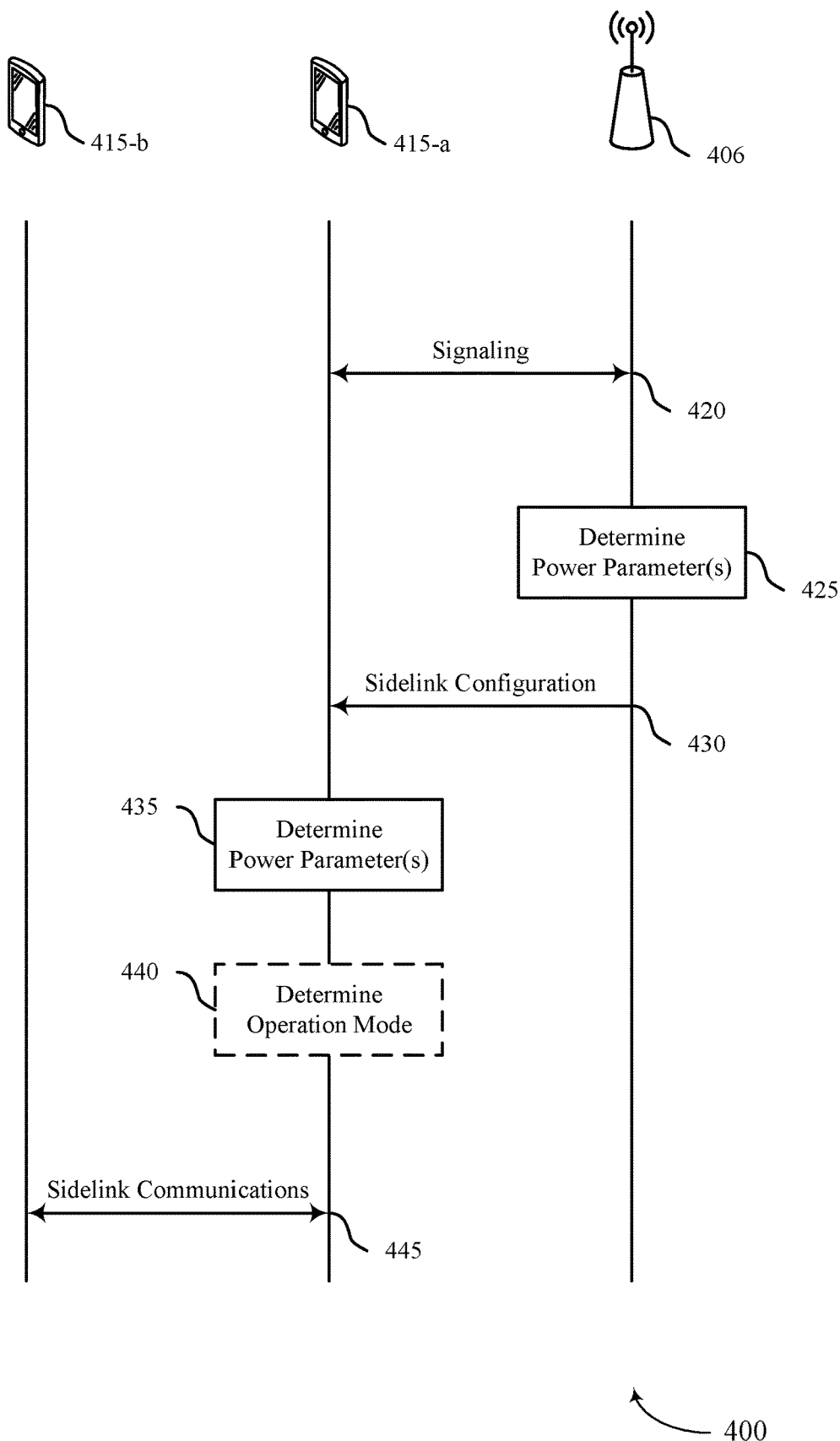
FIG. 4 illustrates an example of a process flow that supports access point assisted sidelink communications in accordance with aspects of the present disclosure.

FIG. 4 illustrates an example of a process flow 400 that supports access point assisted sidelink communications in accordance with aspects of the present disclosure. In some examples, the process flow 400 may implement one or more aspects of wireless communications systems 100, 200, or 300. For example, the process flow 400 may include example operations associated with an AP 406 and one or more UEs 415, which may be examples of corresponding devices described with reference to FIGS. 1 through 3. In the following description of the process flow 400, the operations between the AP 406 and the UEs 415 may be performed in a different order than the example order shown, or the operations performed by the AP 406 and the UEs 415 may be performed in different orders or at different times. Some operations may also be omitted from the process flow 400, and other operations may be added to the process flow 400.

The operations performed by the AP 406 and the UEs 415 may support improvements to sidelink communications and, in some examples, may promote improvements to communications efficiency, among other benefits.

At 420, the AP 406 may exchange signaling with the UE 415-a on a first channel in a first radio frequency spectrum band. In some examples, the signaling may include the AP 406 transmitting an anchor signal, an SSB, a reference signal, or another signal, or any combination thereof, to the UE 415-a. Additionally or alternatively, the signaling may include the UE 415-a transmitting one or more reference signals to the AP 406. In some examples, the AP 406 may exchange the signaling with the UE 415-a according to a configured operation mode, such as a standard power mode, an LPI mode, a VLP mode, etc. In some examples, the exchanged signaling may indicate the UE 415-a and a UE 415-b are in communication with an access point, such as the AP 406 or another access point (not shown).

At 425, the AP 406 may determine one or more power parameters for sidelink communications between the UE 415-a and the UE 415-b on a second channel in a second radio frequency spectrum band. The power parameters may include a PSD, an EIRP, another power parameter, or any combination thereof. In some examples, the AP 406 may determine the power parameters based on the signaling exchanged with the UE 415-a.

At 430, the AP 406 may transmit a sidelink configuration for the sidelink communications to the UE 415-a. In some examples, the sidelink configuration may indicate the determined power parameters, an operation mode for the sidelink communications, the second channel, the second radio frequency spectrum band, or any combination thereof. In some examples, the sidelink configuration may be based on the exchanged signaling.

At 435, the UE 415-a may determine the power parameters for the sidelink communications between the UE 415-a and the UE 415-b. In some examples, the UE 415-a may determine the power parameters based on receiving the sidelink configuration, the exchanged signaling, or both.

In some examples, at 440 the UE 415-a may determine the operation mode for the sidelink communications. The operation mode may be a standard power mode, an LPI mode, a VLP mode, or another operation mode. In some examples, the UE 415-a may determine the operation mode based on receiving the sidelink configuration, the exchanged signaling, or both.

At 445, the UE 415-a may communicate with the UE 415-b on the second channel in the second radio frequency spectrum band in accordance with the sidelink configuration. The first channel and the second channel may be a same channel or different channels. The first radio frequency spectrum band and the second radio frequency spectrum band may be a same radio frequency spectrum band (e.g., a U-NII band) or different radio frequency spectrum bands. The operations performed by the AP 406 and the UEs 415 may improve efficiency and reliability of the sidelink communications, among other benefits.

Figure 5:
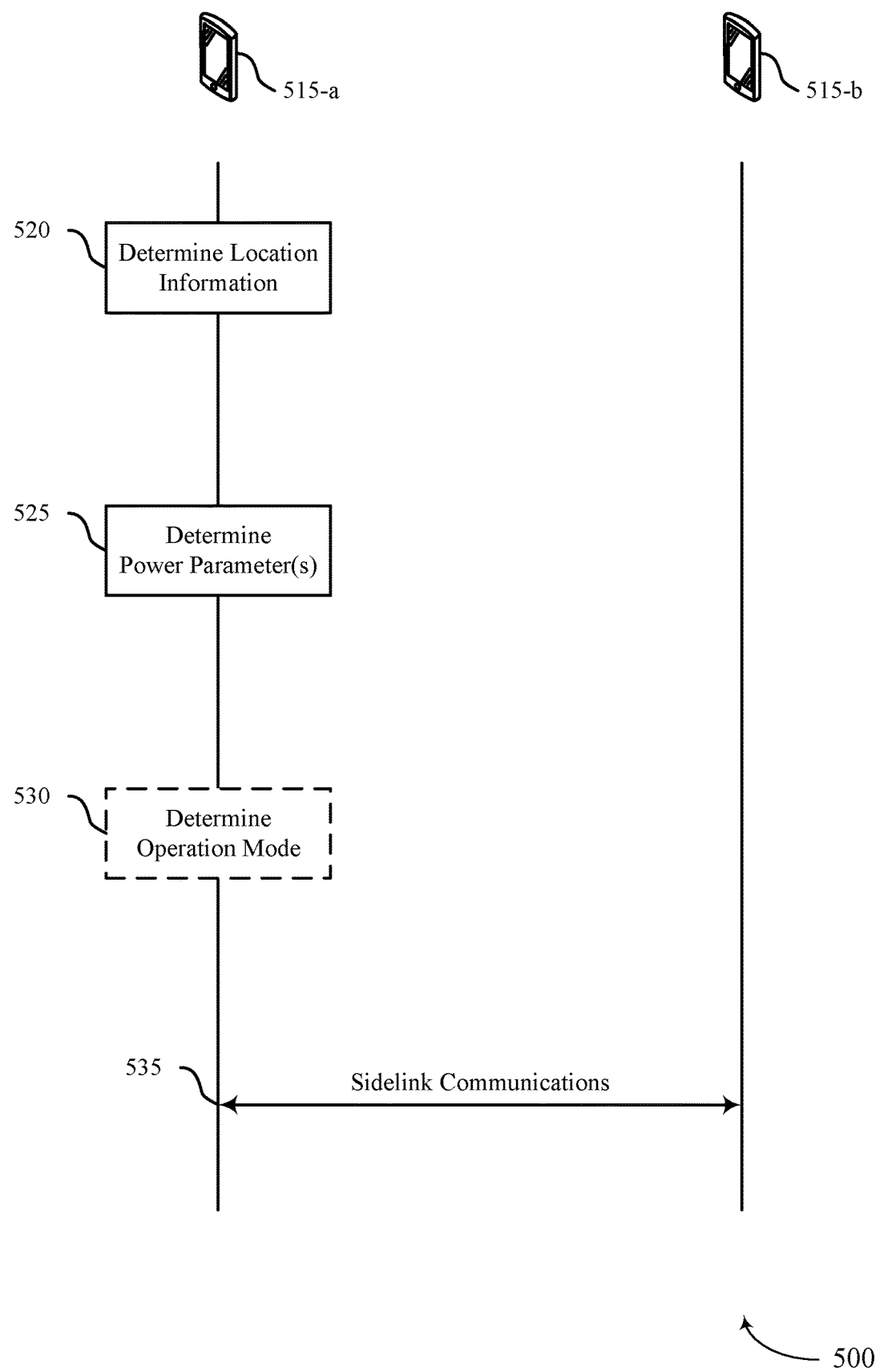
FIG. 5 illustrates an example of a process flow that supports access point assisted sidelink communications in accordance with aspects of the present disclosure.

FIG. 5 illustrates an example of a process flow 500 that supports access point assisted sidelink communications in accordance with aspects of the present disclosure. In some examples, the process flow 500 may implement one or more aspects of wireless communications systems 100, 200, or 300. For example, the process flow 500 may include example operations associated with one or more UEs 515, which may be examples of corresponding devices described with reference to FIGS. 1 through 3. In the following description of the process flow 500, the operations between the UEs 515 may be performed in a different order than the example order shown, or the operations performed by the UEs 515 may be performed in different orders or at different times. Some operations may also be omitted from the process flow 500, and other operations may be added to the process flow 500. The operations performed by the UEs 515 may support improvements to sidelink communications and, in some examples, may promote improvements to communications efficiency, among other benefits.

At 520, a UE 515-a may determine location information for the UE 515-a and a UE 515-b. In some examples, the UE 515-a may receive the location information (e.g., ultra wideband positioning information, a configuration, a setting, or other location information) indicating the UEs 515 are located indoors. In some examples, the UE 515-a may receive the location information from one or more sensors, one or more actuators, or other mechanisms, or any combination thereof, such as mechanisms associated with indoor factory automation.

At 525, the UE 515-a may determine one or more power parameters for sidelink communications between the UE 515-a and the UE 515-b on a channel in a radio frequency spectrum band. The power parameters may include a PSD, an EIRP, another power parameter, or any combination thereof. In some examples, the UE 515-a may determine the power parameters based on the determining the UEs 515 are located indoors.

In some examples, the UE 515-a may determine the operation mode for the sidelink communications. The operation mode may be a standard power mode, an LPI mode, a VLP mode, or another operation mode. In some examples, the UE 515-a may determine the operation mode based on the determining the UEs 515 are located indoors.

At 535, the UE 515-a may communicate with the UE 515-b on the channel in the radio frequency spectrum band in accordance with the determined power parameters. In some examples, the radio frequency spectrum band may be a U-NII band. The operations performed by the UEs 515 may improve efficiency and reliability of the sidelink communications, among other benefits.

Figure 6:
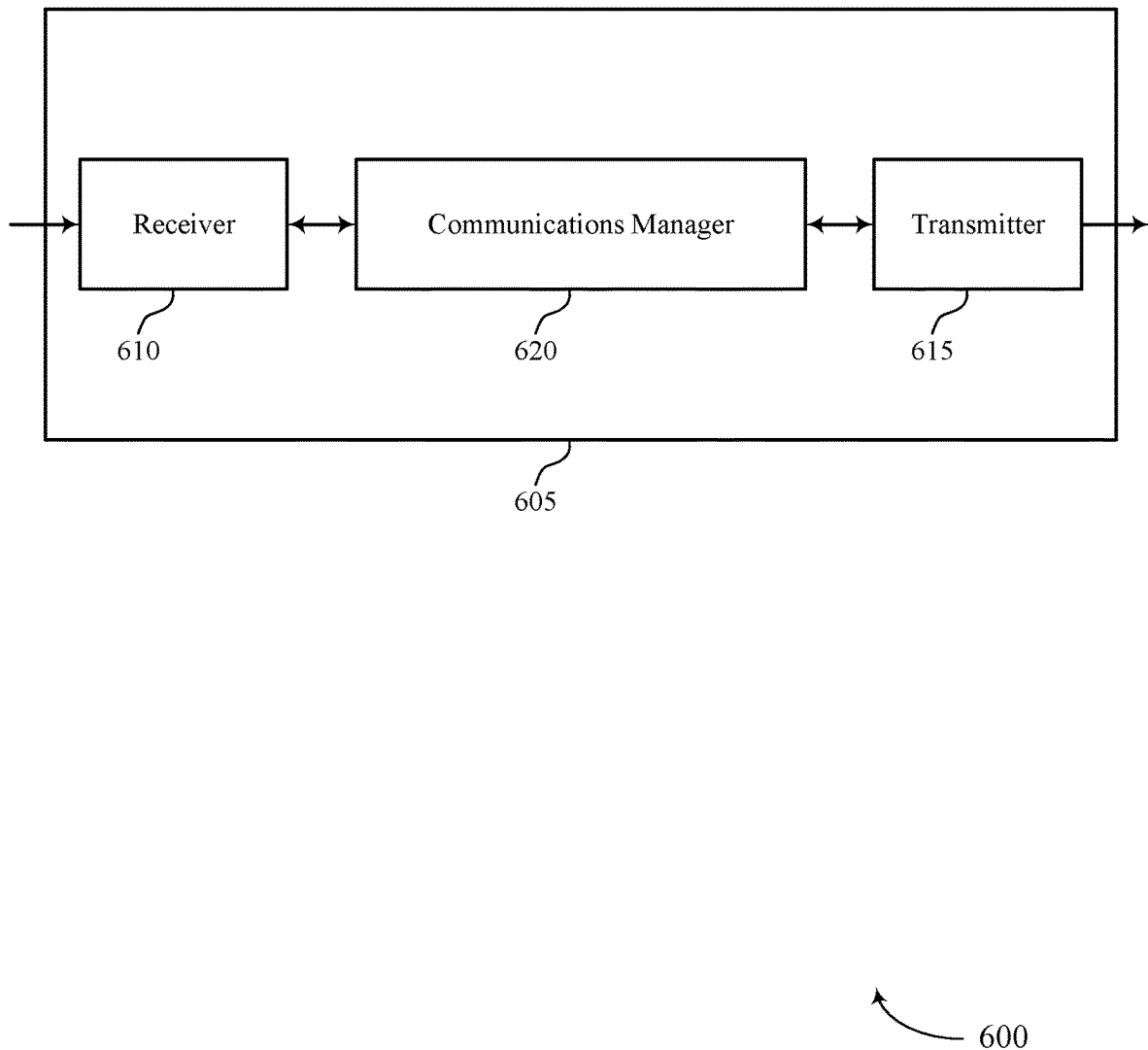
FIGS. 6 and 7 show block diagrams of devices that support access point assisted sidelink communications in accordance with aspects of the present disclosure.

FIG. 6 shows a block diagram 600 of a device 605 that supports access point assisted sidelink communications in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to access point assisted sidelink communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to access point assisted sidelink communications). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of access point assisted sidelink communications as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first UE in accordance with examples as disclosed herein. For example, the communications manager 620 may be configured as or otherwise support a means for receiving, from a first access point on a first channel, a sidelink configuration for sidelink communications with a second UE on a second channel, where the sidelink configuration is provided to the first UE based on both the first UE and the second UE being in communication with an access point. The communications manager 620 may be configured as or otherwise support a means for determining one or more power parameters from the sidelink configuration, the one or more power parameters being for the sidelink communications and being based on signaling on the first channel. The communications manager 620 may be configured as or otherwise support a means for communicating with the second UE on the second channel in accordance with the sidelink configuration.

Additionally or alternatively, the communications manager 620 may support wireless communications at a first UE in accordance with examples as disclosed herein. For example, the communications manager 620 may be configured as or otherwise support a means for determining that the first UE is located indoors. The communications manager 620 may be configured as or otherwise support a means for determining one or more power parameters for sidelink communications that are facilitated by the first UE being located indoors. The communications manager 620 may be configured as or otherwise support a means for communicating with a second UE via the sidelink communications based on the UE being located indoors and the one or more power parameters.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reducing power consumption and increasing transmission reliability. In some aspects, the processor of the device 605 may adjust power parameters based on the sidelink configuration or location information. For example, the processor of the device 605 may turn on one or more processing units for processing a sidelink configuration or sensor data, increase a processing clock, or a similar mechanism within the device 605. As such, when subsequent sidelink configurations or location data are received, the processor may more accurately adjust power parameters for sidelink communications. Improvements in sidelink communications may result in improvements in power saving and communications reliability, which may further increase power efficiency at the device 605 (e.g., by eliminating unnecessary repeated sidelink configurations).

Figure 7:
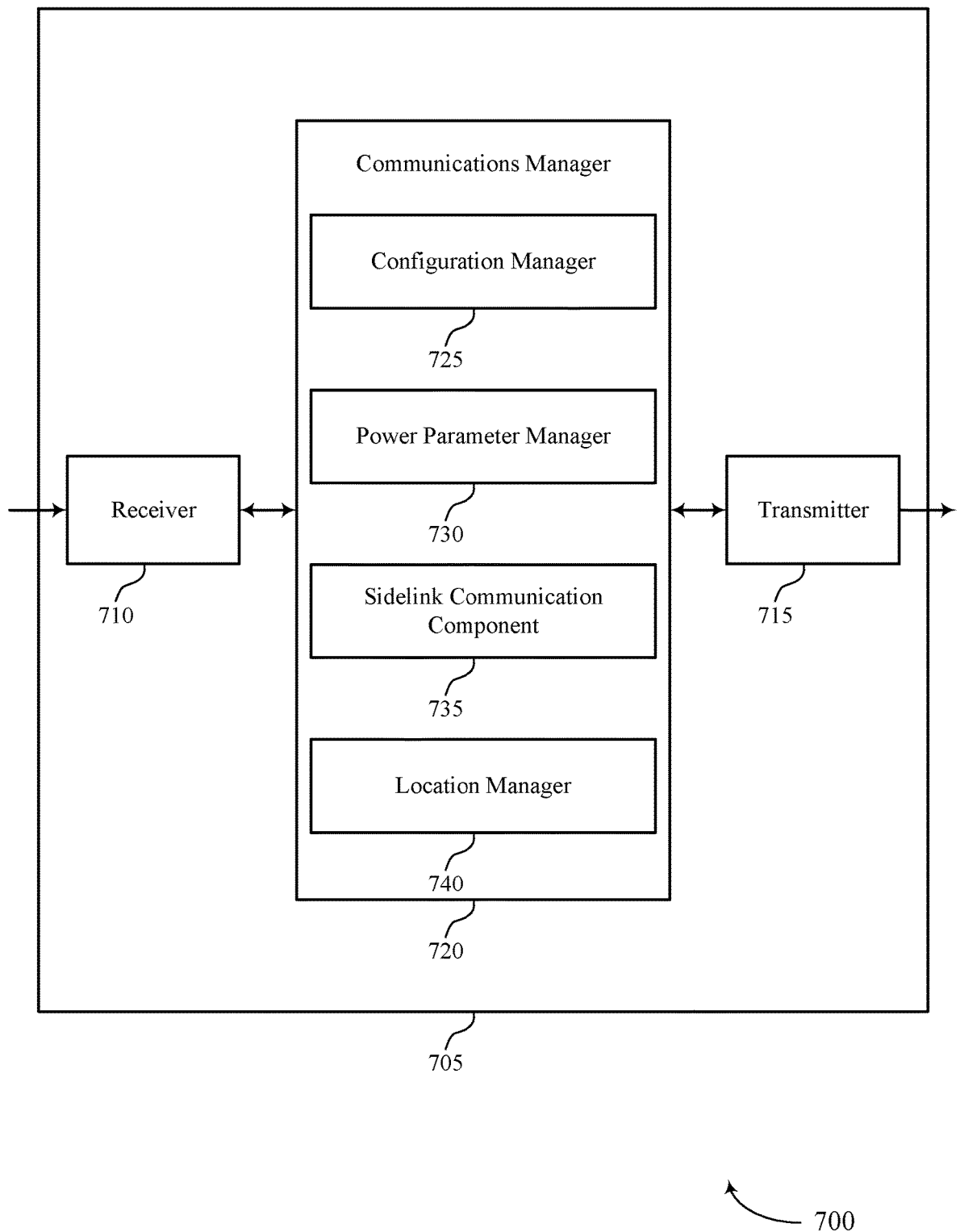

FIG. 7 shows a block diagram 700 of a device 705 that supports access point assisted sidelink communications in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to access point assisted sidelink communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to access point assisted sidelink communications). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of access point assisted sidelink communications as described herein. For example, the communications manager 720 may include a configuration manager 725, a power parameter manager 730, a sidelink communication component 735, a location manager 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a first UE in accordance with examples as disclosed herein. The configuration manager 725 may be configured as or otherwise support a means for receiving, from a first access point on a first channel, a sidelink configuration for sidelink communications with a second UE on a second channel, where the sidelink configuration is provided to the first UE based on both the first UE and the second UE being in communication with an access point. The power parameter manager 730 may be configured as or otherwise support a means for determining one or more power parameters from the sidelink configuration, the one or more power parameters being for the sidelink communications and being based on signaling on the first channel. The sidelink communication component 735 may be configured as or otherwise support a means for communicating with the second UE on the second channel in accordance with the sidelink configuration.

Additionally or alternatively, the communications manager 720 may support wireless communications at a first UE in accordance with examples as disclosed herein. The location manager 740 may be configured as or otherwise support a means for determining that the first UE is located indoors. The power parameter manager 730 may be configured as or otherwise support a means for determining one or more power parameters for sidelink communications that are facilitated by the first UE being located indoors. The sidelink communication component 735 may be configured as or otherwise support a means for communicating with a second UE via the sidelink communications based on the UE being located indoors and the one or more power parameters.

Figure 8:
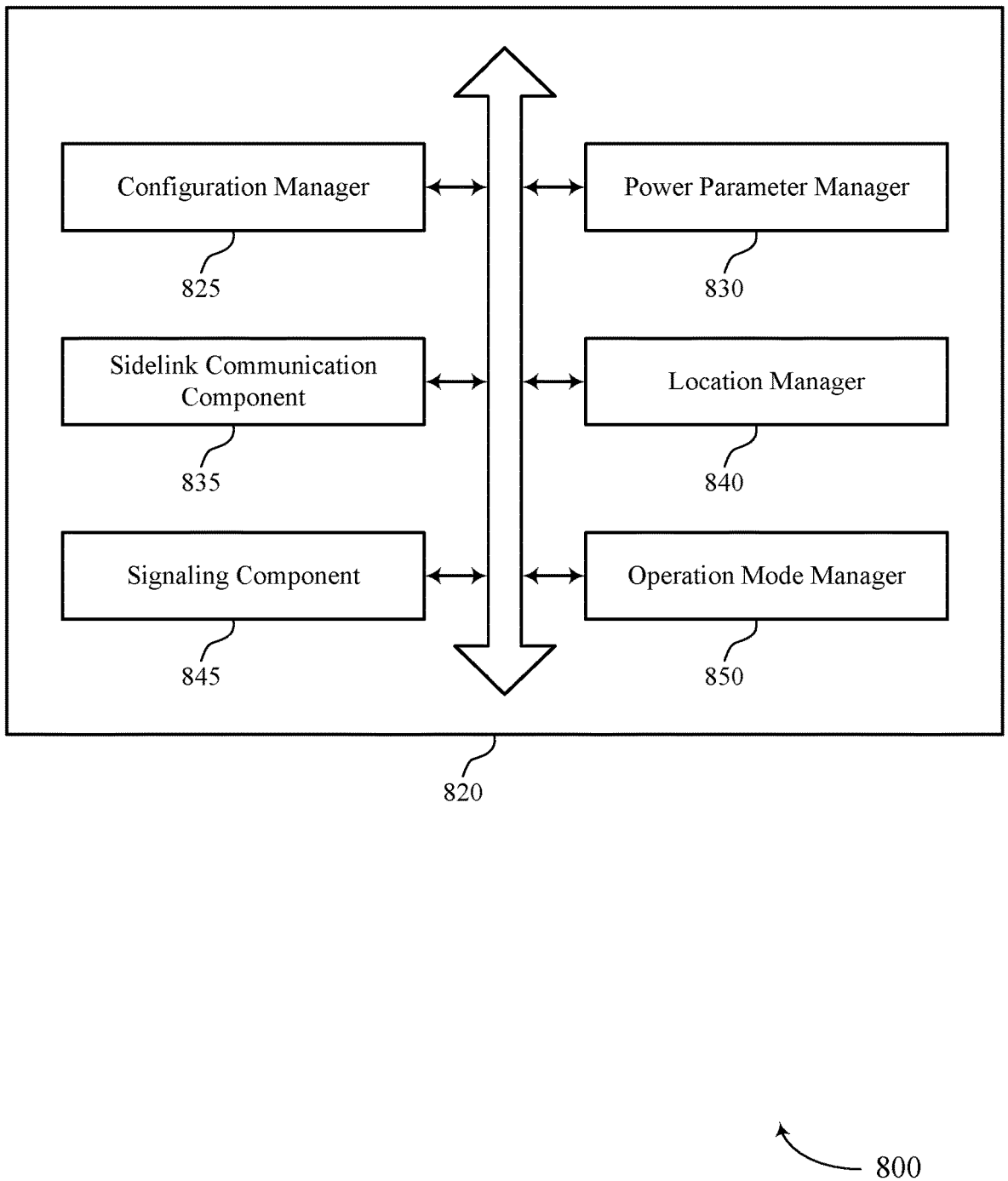
FIG. 8 shows a block diagram of a communications manager that supports access point assisted sidelink communications in accordance with aspects of the present disclosure.

FIG. 8 shows a block diagram 800 of a communications manager 820 that supports access point assisted sidelink communications in accordance with aspects of the present disclosure. The communications manager 820 may be an example of aspects of a communications manager 620, a communications manager 720, or both, as described herein. The communications manager 820, or various components thereof, may be an example of means for performing various aspects of access point assisted sidelink communications as described herein. For example, the communications manager 820 may include a configuration manager 825, a power parameter manager 830, a sidelink communication component 835, a location manager 840, a signaling component 845, an operation mode manager 850, or any combination thereof. Each of these components may communicate, directly or indirectly, with one another (e.g., via one or more buses).

The communications manager 820 may support wireless communications at a first UE in accordance with examples as disclosed herein. The configuration manager 825 may be configured as or otherwise support a means for receiving, from a first access point on a first channel, a sidelink configuration for sidelink communications with a second UE on a second channel, where the sidelink configuration is provided to the first UE based on both the first UE and the second UE being in communication with an access point. The power parameter manager 830 may be configured as or otherwise support a means for determining one or more power parameters from the sidelink configuration, the one or more power parameters being for the sidelink communications and being based on signaling on the first channel. The sidelink communication component 835 may be configured as or otherwise support a means for communicating with the second UE on the second channel in accordance with the sidelink configuration.

In some examples, the signaling component 845 may be configured as or otherwise support a means for receiving one or more signals from the first access point, where the sidelink configuration is received based on receiving the one or more signals, and where the signaling on the first channel includes the one or more signals.

In some examples, the one or more signals include an anchor signal, a synchronization signal block, a reference signal, or any combination thereof.

In some examples, the signaling component 845 may be configured as or otherwise support a means for transmitting one or more reference signals to the first access point, where the sidelink configuration is received based on transmitting the one or more reference signals, and where the signaling on the first channel includes the one or more reference signals.

In some examples, the operation mode manager 850 may be configured as or otherwise support a means for determining a first operation mode for communications with the first access point and a second operation mode for the sidelink communications, where communicating with the second UE on the second channel is in accordance with the second operation mode.

In some examples, each of the first operation mode and the second operation mode includes a standard power mode or a low power indoor mode.

In some examples, the one or more power parameters include a power spectral density of the sidelink communications, an equivalent isotropic radiated power of the sidelink communications, or both.

In some examples, the first channel and the second channel include a same channel.

In some examples, the first channel is different from the second channel.

In some examples, the first channel and the second channel are in a same radio frequency spectrum band.

In some examples, the first channel is in a first radio frequency spectrum band and the second channel is in a second radio frequency spectrum band.

Additionally or alternatively, the communications manager 820 may support wireless communications at a first UE in accordance with examples as disclosed herein. The location manager 840 may be configured as or otherwise support a means for determining that the first UE is located indoors. In some examples, the power parameter manager 830 may be configured as or otherwise support a means for determining one or more power parameters for sidelink communications that are facilitated by the first UE being located indoors. In some examples, the sidelink communication component 835 may be configured as or otherwise support a means for communicating with a second UE via the sidelink communications based on the UE being located indoors and the one or more power parameters.

In some examples, the location manager 840 may be configured as or otherwise support a means for receiving location information associated with the first UE, where determining that the first UE is located indoors is based on receiving the location information.

In some examples, the location information is received from one or more sensors, one or more actuators, or any combination thereof.

In some examples, the location information includes ultra wideband positioning information, a configuration, a setting, or any combination thereof.

In some examples, the operation mode manager 850 may be configured as or otherwise support a means for determining an operation mode for the sidelink communications, where communicating with the second UE is in accordance with the operation mode.

In some examples, the operation mode includes a standard power mode or a low power indoor mode.

In some examples, the one or more power parameters include a power spectral density of the sidelink communications, an equivalent isotropic radiated power of the sidelink communications, or both.

Figure 9:
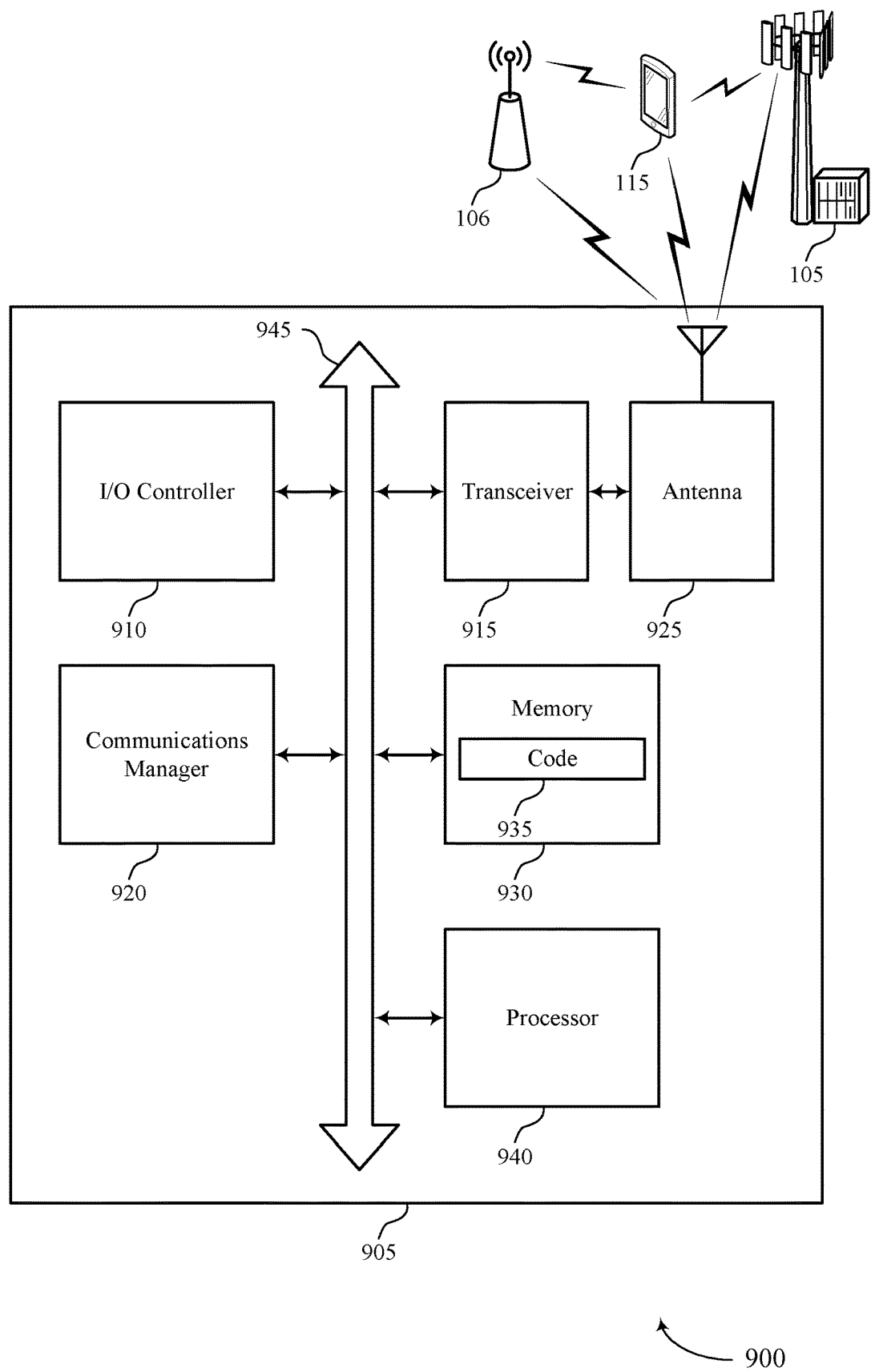
FIG. 9 shows a diagram of a system including a device that supports access point assisted sidelink communications in accordance with aspects of the present disclosure.

FIG. 9 shows a diagram of a system 900 including a device 905 that supports access point assisted sidelink communications in accordance with aspects of the present disclosure. The device 905 may be an example of or include the components of a device 605, a device 705, or a UE 115 as described herein. The device 905 may communicate wirelessly with one or more APs 106, base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting access point assisted sidelink communications). For example, the device 905 or a component of the device 905 may include a processor 940 and memory 930 coupled to the processor 940, the processor 940 and memory 930 configured to perform various functions described herein.

The communications manager 920 may support wireless communications at a first UE in accordance with examples as disclosed herein. For example, the communications manager 920 may be configured as or otherwise support a means for receiving, from a first access point on a first channel, a sidelink configuration for sidelink communications with a second UE on a second channel, where the sidelink configuration is provided to the first UE based on both the first UE and the second UE being in communication with an access point. The communications manager 920 may be configured as or otherwise support a means for determining one or more power parameters from the sidelink configuration, the one or more power parameters being for the sidelink communications and being based on signaling on the first channel. The communications manager 920 may be configured as or otherwise support a means for communicating with the second UE on the second channel in accordance with the sidelink configuration.

Additionally or alternatively, the communications manager 920 may support wireless communications at a first UE in accordance with examples as disclosed herein. For example, the communications manager 920 may be configured as or otherwise support a means for determining that the first UE is located indoors. The communications manager 920 may be configured as or otherwise support a means for determining one or more power parameters for sidelink communications that are facilitated by the first UE being located indoors. The communications manager 920 may be configured as or otherwise support a means for communicating with a second UE via the sidelink communications based on the UE being located indoors and the one or more power parameters.

By including or configuring the communications manager 920 in accordance with examples as described herein, the device 905 may support techniques for saving power by communicating with UEs 115 (as shown in FIG. 1) in sidelink communications more efficiently. For example, the device 905 may improve reliability in sidelink communications with UEs 115, as the device 905 may be able to reliably adjust power parameters for the sidelink communications based on a received sidelink configuration or determined location data. Using the techniques described herein, the device 905 may more accurately communicate with UEs 115, which may improve power efficiency at the device 905.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of access point assisted sidelink communications as described herein, or the processor 940 and the memory 930 may be otherwise configured to perform or support such operations.

Figure 10:
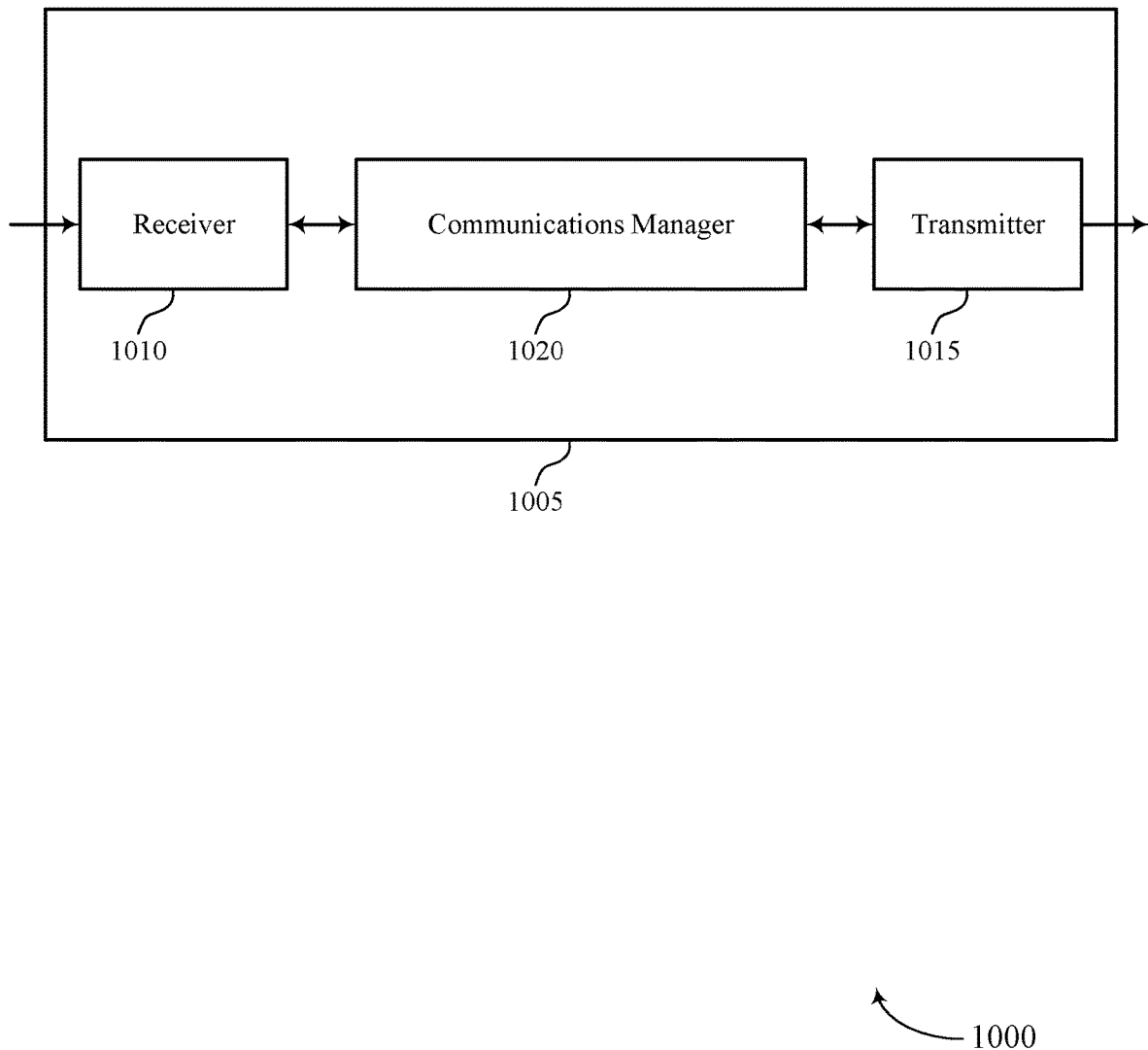
FIGS. 10 and 11 show block diagrams of devices that support access point assisted sidelink communications in accordance with aspects of the present disclosure.

FIG. 10 shows a block diagram 1000 of a device 1005 that supports access point assisted sidelink communications in accordance with aspects of the present disclosure. The device 1005 may be an example of aspects of an AP 106 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to access point assisted sidelink communications). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to access point assisted sidelink communications). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of access point assisted sidelink communications as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a first access point in accordance with examples as disclosed herein. For example, the communications manager 1020 may be configured as or otherwise support a means for determining one or more power parameters for sidelink communications between a first UE and a second UE, the one or more power parameters based on signaling on a first channel. The communications manager 1020 may be configured as or otherwise support a means for transmitting, to the first UE on the first channel, a sidelink configuration for the sidelink communications on a second channel, where the sidelink configuration is provided to the first UE based on both the first UE and the second UE being in communication with an access point.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for efficient configuration of sidelink communications. In some aspects, the processor of the device 1005 may adjust power parameters for sidelink communications between UEs based on signaling exchanged with the UEs. For example, the processor of the device 1005 may turn on one or more processing units for processing exchanged signaling, increase a processing clock, or a similar mechanism within the device 1005. As such, when subsequent sidelink communications are to be configured, the processor may more accurately determine associated power parameters. Improvements in sidelink communication configuration may result in improvements in power saving and communications reliability, which may further increase power efficiency at the device 1005 (e.g., by eliminating unnecessary repeated transmissions due to interference).

Figure 11:
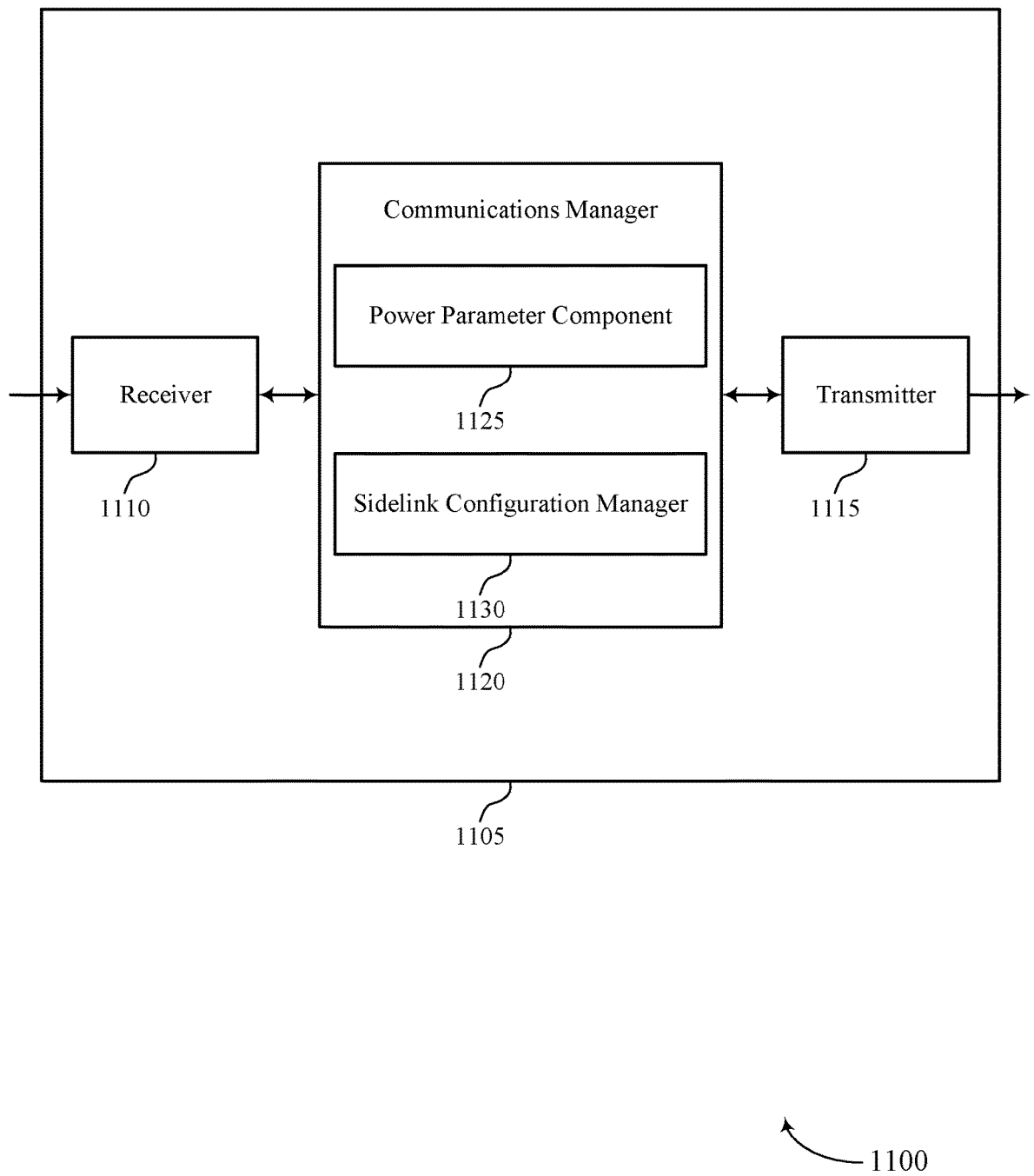

FIG. 11 shows a block diagram 1100 of a device 1105 that supports access point assisted sidelink communications in accordance with aspects of the present disclosure. The device 1105 may be an example of aspects of a device 1005 or an AP 106 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to access point assisted sidelink communications). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to access point assisted sidelink communications). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of access point assisted sidelink communications as described herein. For example, the communications manager 1120 may include a power parameter component 1125 a sidelink configuration manager 1130, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a first access point in accordance with examples as disclosed herein. The power parameter component 1125 may be configured as or otherwise support a means for determining one or more power parameters for sidelink communications between a first UE and a second UE, the one or more power parameters based on signaling on a first channel. The sidelink configuration manager 1130 may be configured as or otherwise support a means for transmitting, to the first UE on the first channel, a sidelink configuration for the sidelink communications on a second channel, where the sidelink configuration is provided to the first UE based on both the first UE and the second UE being in communication with an access point.

Figure 12:
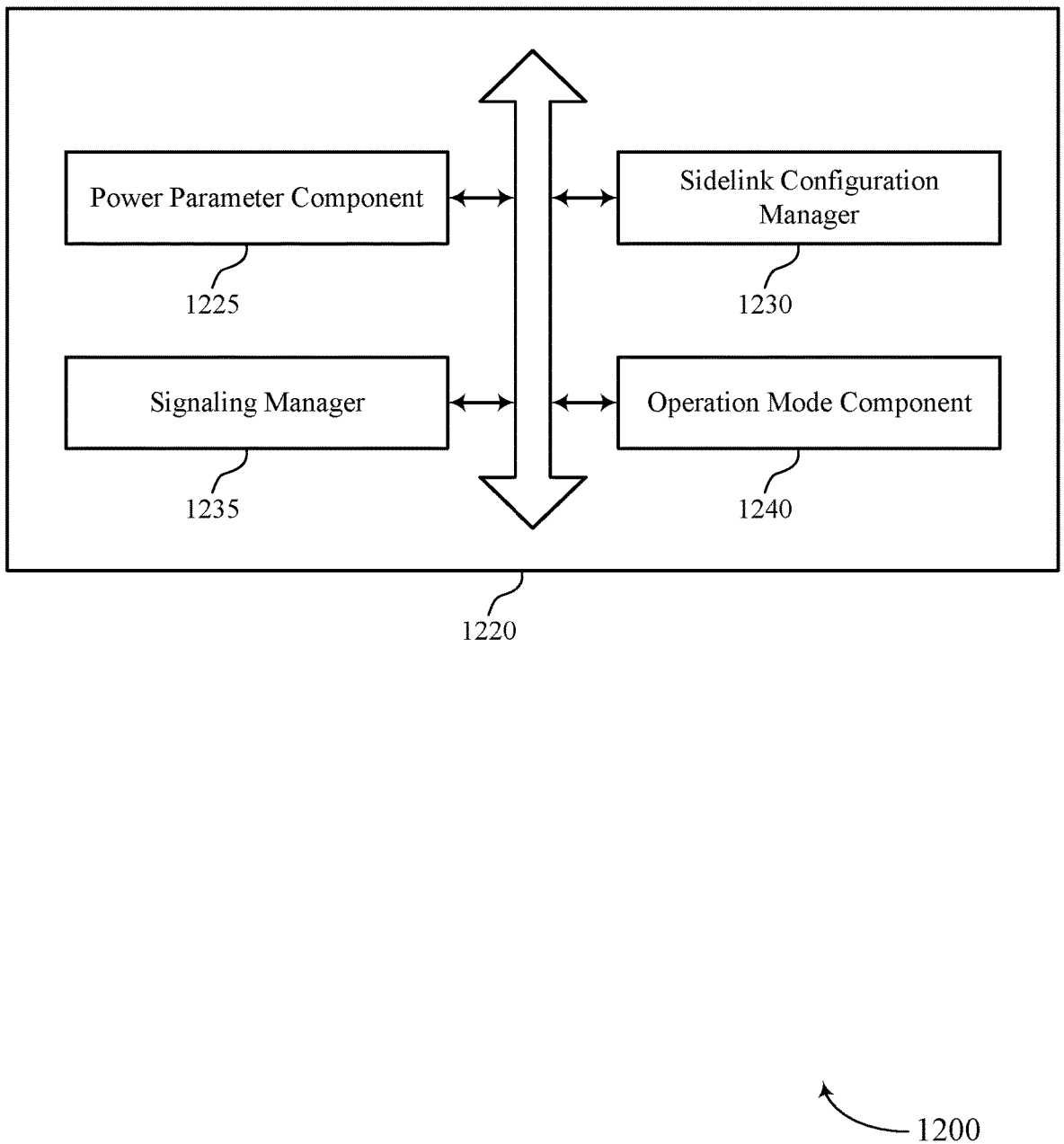
FIG. 12 shows a block diagram of a communications manager that supports access point assisted sidelink communications in accordance with aspects of the present disclosure.

FIG. 12 shows a block diagram 1200 of a communications manager 1220 that supports access point assisted sidelink communications in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of access point assisted sidelink communications as described herein. For example, the communications manager 1220 may include a power parameter component 1225, a sidelink configuration manager 1230, a signaling manager 1235, an operation mode component 1240, or any combination thereof. Each of these components may communicate, directly or indirectly, with one another (e.g., via one or more buses).

The communications manager 1220 may support wireless communications at a first access point in accordance with examples as disclosed herein. The power parameter component 1225 may be configured as or otherwise support a means for determining one or more power parameters for sidelink communications between a first UE and a second UE, the one or more power parameters based on signaling on a first channel. The sidelink configuration manager 1230 may be configured as or otherwise support a means for transmitting, to the first UE on the first channel, a sidelink configuration for the sidelink communications on a second channel, where the sidelink configuration is provided to the first UE based on both the first UE and the second UE being in communication with an access point.

In some examples, the signaling manager 1235 may be configured as or otherwise support a means for transmitting one or more signals to the first UE, where the one or more power parameters are determined based on transmitting the one or more signals, and where the signaling on the first channel includes the one or more signals.

In some examples, the one or more signals include an anchor signal, a synchronization signal block, a reference signal, or any combination thereof.

In some examples, the signaling manager 1235 may be configured as or otherwise support a means for receiving one or more reference signals from the first UE, where the one or more power parameters are determined based on receiving the one or more reference signals, and where the signaling on the first channel includes the one or more reference signals.

In some examples, the operation mode component 1240 may be configured as or otherwise support a means for determining a first operation mode for communications with the first UE and a second operation mode for the sidelink communications, where communicating with the first UE on the first channel is in accordance with the first operation mode.

In some examples, each of the first operation mode and the second operation mode includes a standard power mode or a low power indoor mode.

In some examples, the one or more power parameters include a power spectral density of the sidelink communications, an equivalent isotropic radiated power of the sidelink communications, or both.

In some examples, the first channel and the second channel include a same channel.

In some examples, the first channel is different from the second channel.

In some examples, the first channel and the second channel are in a same radio frequency spectrum band.

In some examples, the first channel is in a first radio frequency spectrum band and the second channel is in a second radio frequency spectrum band.

Figure 13:
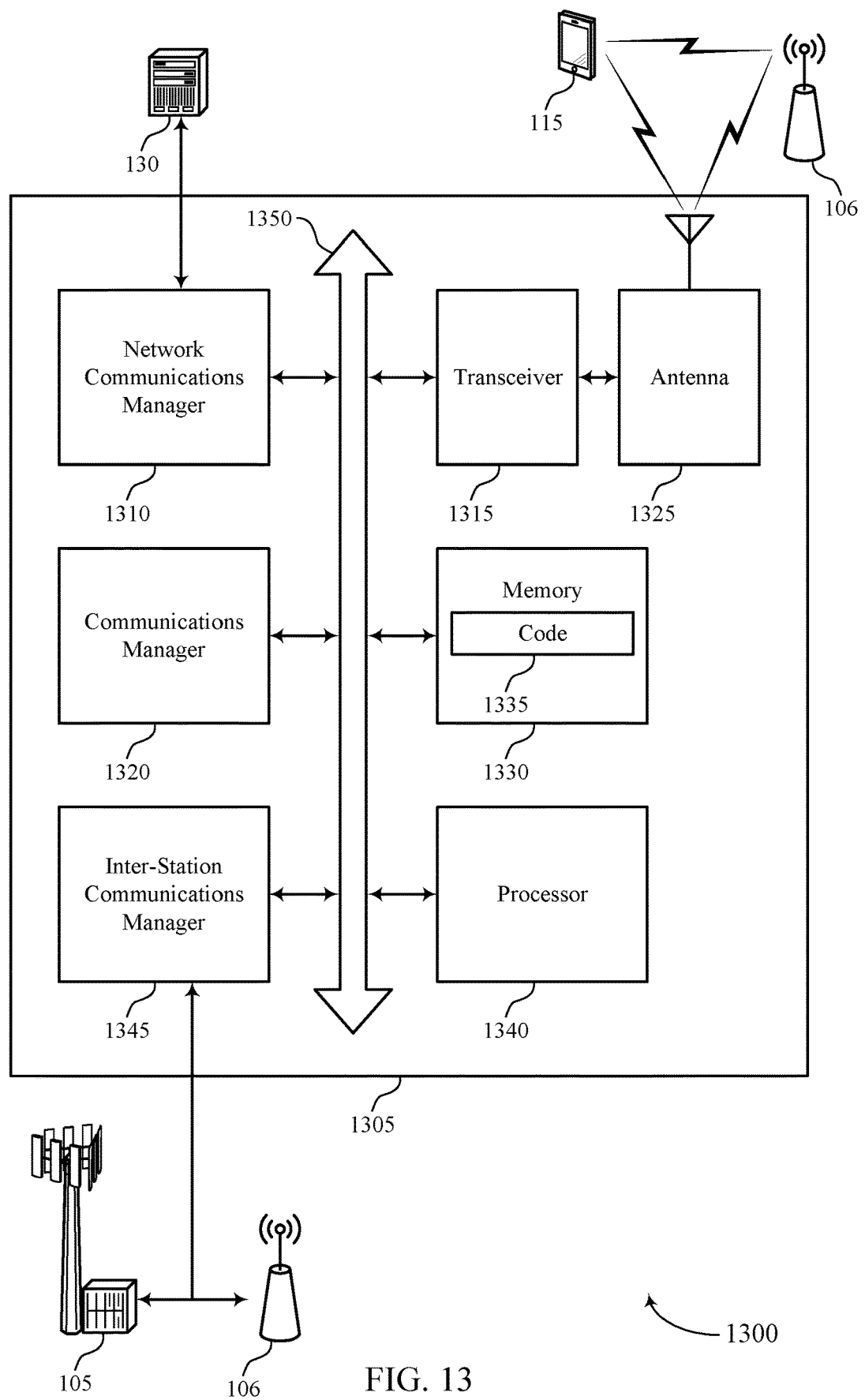
FIG. 13 shows a diagram of a system including a device that supports access point assisted sidelink communications in accordance with aspects of the present disclosure.

FIG. 13 shows a diagram of a system 1300 including a device 1305 that supports access point assisted sidelink communications in accordance with aspects of the present disclosure. The device 1305 may be an example of or include the components of a device 1005, a device 1105, or an AP 106 as described herein. The device 1305 may communicate wirelessly with one or more APs 106, base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting access point assisted sidelink communications). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105 or APs 106, and may include a controller or scheduler for controlling communications with UEs 115 in cooperation with other base stations 105 or APs 106. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105 or APs 106.

The communications manager 1320 may support wireless communications at a first access point in accordance with examples as disclosed herein. For example, the communications manager 1320 may be configured as or otherwise support a means for determining one or more power parameters for sidelink communications between a first UE and a second UE, the one or more power parameters based on signaling on a first channel. The communications manager 1320 may be configured as or otherwise support a means for transmitting, to the first UE on the first channel, a sidelink configuration for the sidelink communications on a second channel, where the sidelink configuration is provided to the first UE based on both the first UE and the second UE being in communication with an access point.

By including or configuring the communications manager 1320 in accordance with examples as described herein, the device 1305 may support techniques for saving power by communicating with UEs 115 (as shown in FIG. 1) more efficiently. For example, the device 1306 may improve reliability in communications with UEs 115, as the device 1306 may be able to reliably configure sidelink communications between UEs 115 to reduce interference. Using the techniques described herein, the device 1306 may more accurately communicate with UEs 115, which may improve power efficiency at the device 1306.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of access point assisted sidelink communications as described herein, or the processor 1340 and the memory 1330 may be otherwise configured to perform or support such operations.

Figure 14:
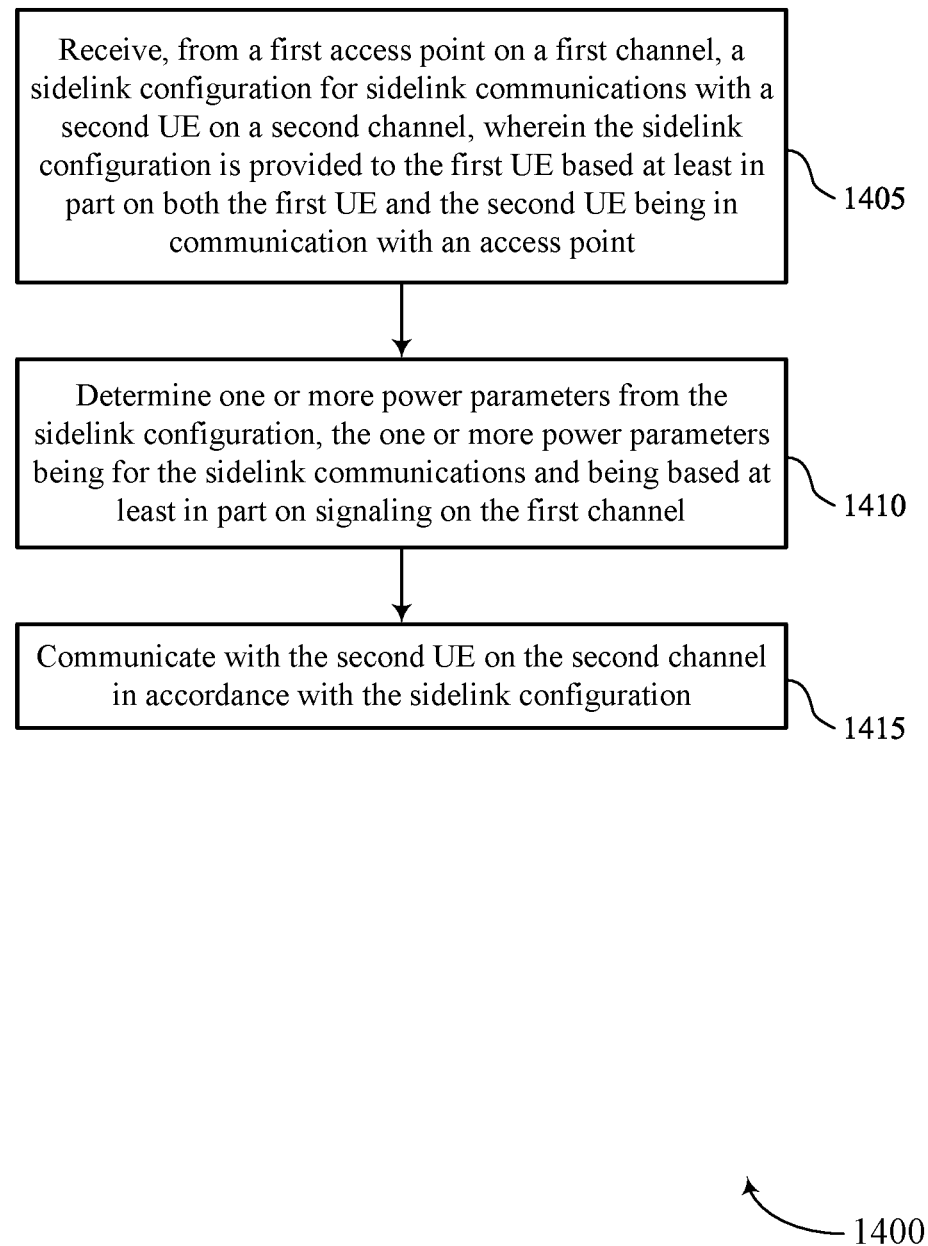
FIGS. 14 through 19 show flowcharts illustrating methods that support access point assisted sidelink communications in accordance with aspects of the present disclosure.

FIG. 14 shows a flowchart illustrating a method 1400 that supports access point assisted sidelink communications in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving, from a first access point on a first channel, a sidelink configuration for sidelink communications with a second UE on a second channel, where the sidelink configuration is provided to the first UE based on both the first UE and the second UE being in communication with an access point. The operations of 1405 may be performed in accordance with examples as disclosed herein. In some examples, aspects of the operations of 1405 may be performed by a configuration manager 825 as described with reference to FIG. 8.

At 1410, the method may include determining one or more power parameters from the sidelink configuration, the one or more power parameters being for the sidelink communications and being based on signaling on the first channel. The operations of 1410 may be performed in accordance with examples as disclosed herein. In some examples, aspects of the operations of 1410 may be performed by a power parameter manager 830 as described with reference to FIG. 8.

At 1415, the method may include communicating with the second UE on the second channel in accordance with the sidelink configuration. The operations of 1415 may be performed in accordance with examples as disclosed herein. In some examples, aspects of the operations of 1415 may be performed by a sidelink communication component 835 as described with reference to FIG. 8.

Figure 15:
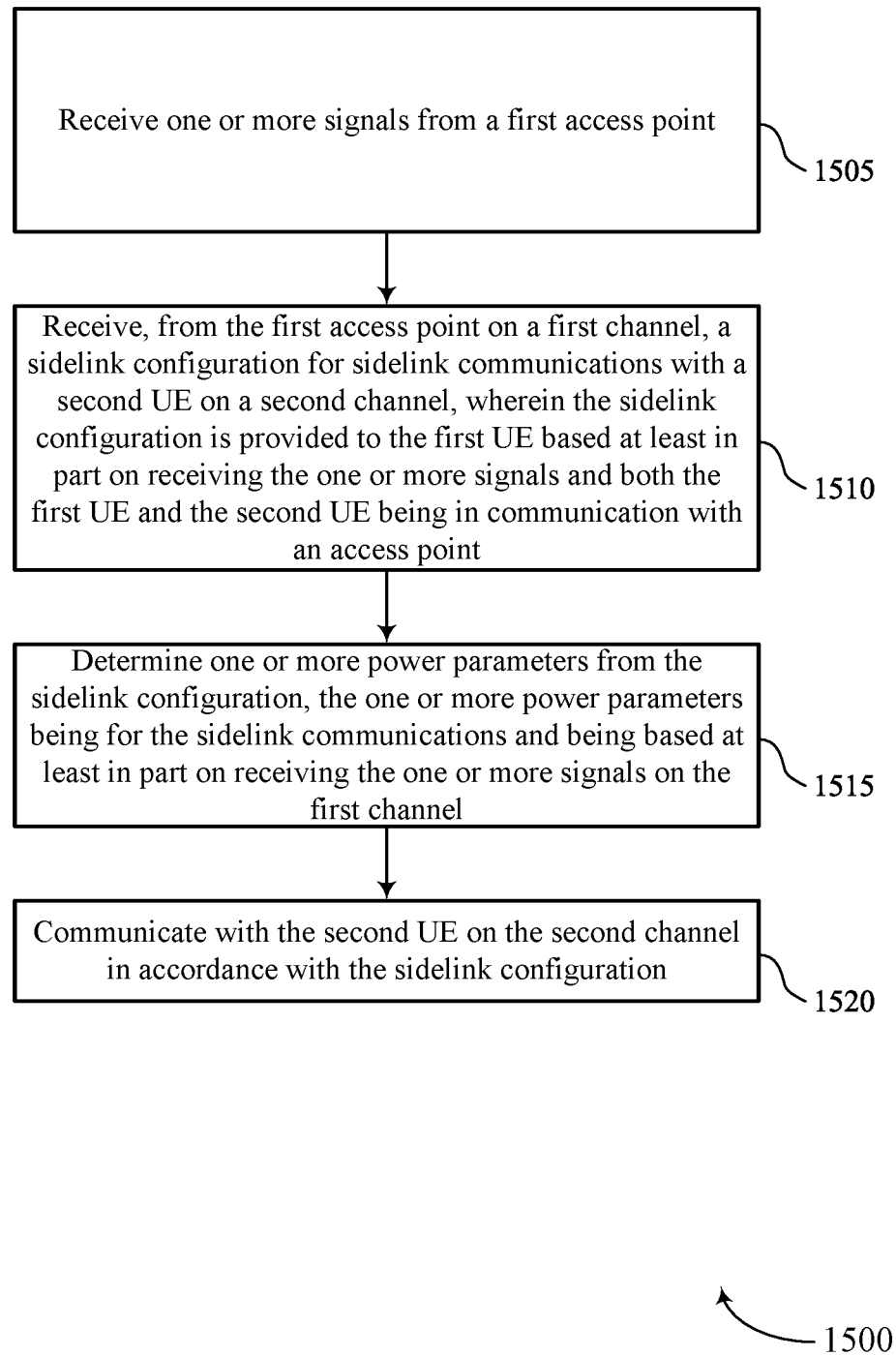

FIG. 15 shows a flowchart illustrating a method 1500 that supports access point assisted sidelink communications in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving one or more signals from a first access point. The operations of 1505 may be performed in accordance with examples as disclosed herein. In some examples, aspects of the operations of 1505 may be performed by a signaling component 845 as described with reference to FIG. 8.

At 1510, the method may include receiving, from the first access point on a first channel, a sidelink configuration for sidelink communications with a second UE on a second channel, where the sidelink configuration is provided to the first UE based on receiving the one or more signals and both the first UE and the second UE being in communication with an access point. The operations of 1510 may be performed in accordance with examples as disclosed herein. In some examples, aspects of the operations of 1510 may be performed by a configuration manager 825 as described with reference to FIG. 8.

At 1515, the method may include determining one or more power parameters from the sidelink configuration, the one or more power parameters being for the sidelink communications and being based on receiving the one or more signals on the first channel. The operations of 1515 may be performed in accordance with examples as disclosed herein. In some examples, aspects of the operations of 1515 may be performed by a power parameter manager 830 as described with reference to FIG. 8.

At 1520, the method may include communicating with the second UE on the second channel in accordance with the sidelink configuration. The operations of 1520 may be performed in accordance with examples as disclosed herein. In some examples, aspects of the operations of 1520 may be performed by a sidelink communication component 835 as described with reference to FIG. 8.

Figure 16:
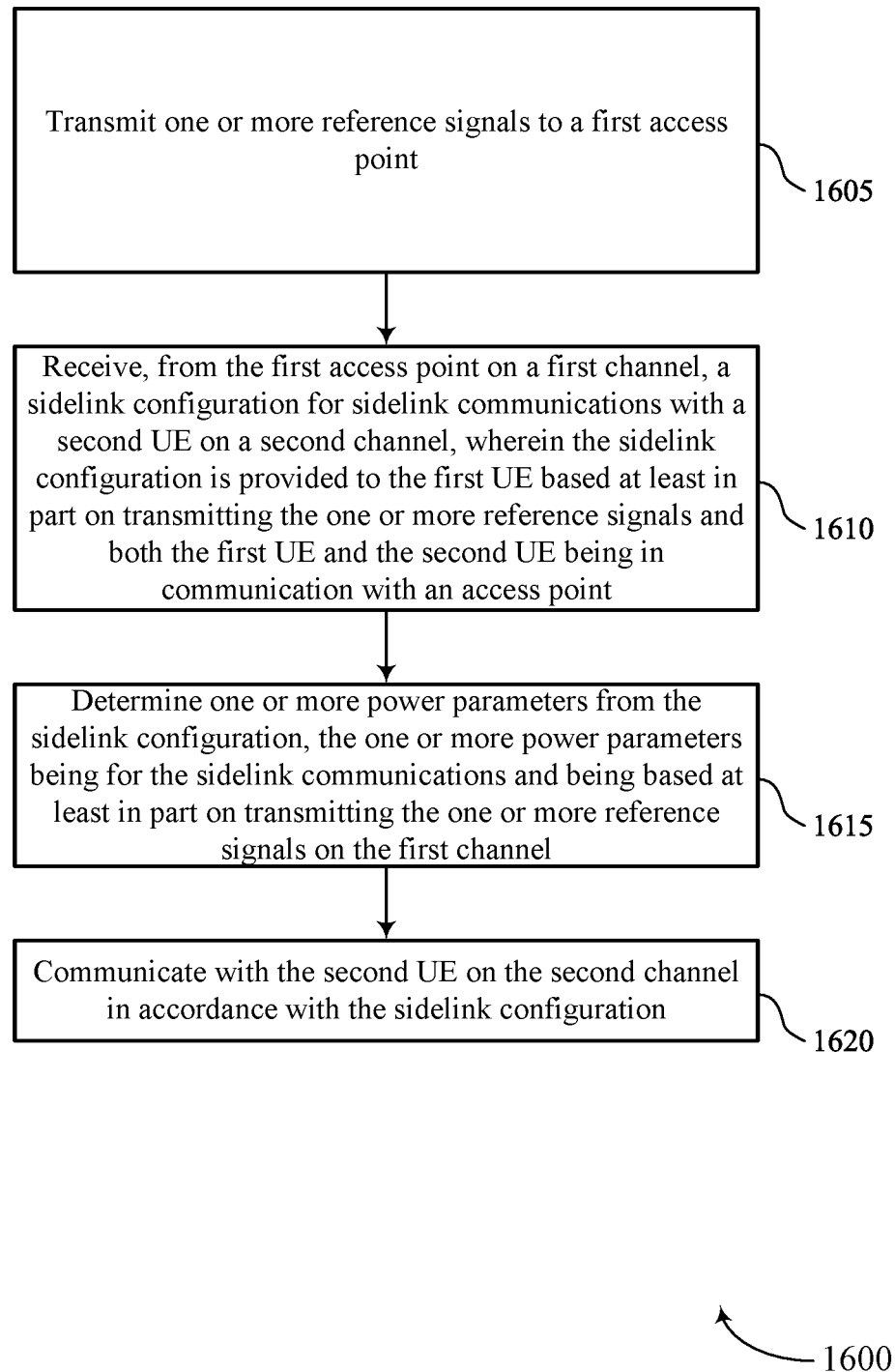

FIG. 16 shows a flowchart illustrating a method 1600 that supports access point assisted sidelink communications in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include transmitting one or more reference signals to a first access point. The operations of 1605 may be performed in accordance with examples as disclosed herein. In some examples, aspects of the operations of 1605 may be performed by a signaling component 845 as described with reference to FIG. 8.

At 1610, the method may include receiving, from the first access point on a first channel, a sidelink configuration for sidelink communications with a second UE on a second channel, where the sidelink configuration is provided to the first UE based on transmitting the one or more reference signals and both the first UE and the second UE being in communication with an access point. The operations of 1610 may be performed in accordance with examples as disclosed herein. In some examples, aspects of the operations of 1610 may be performed by a configuration manager 825 as described with reference to FIG. 8.

At 1615, the method may include determining one or more power parameters from the sidelink configuration, the one or more power parameters being for the sidelink communications and being based on transmitting the one or more reference signals on the first channel. The operations of 1615 may be performed in accordance with examples as disclosed herein. In some examples, aspects of the operations of 1615 may be performed by a power parameter manager 830 as described with reference to FIG. 8.

At 1620, the method may include communicating with the second UE on the second channel in accordance with the sidelink configuration. The operations of 1620 may be performed in accordance with examples as disclosed herein. In some examples, aspects of the operations of 1620 may be performed by a sidelink communication component 835 as described with reference to FIG. 8.

Figure 17:
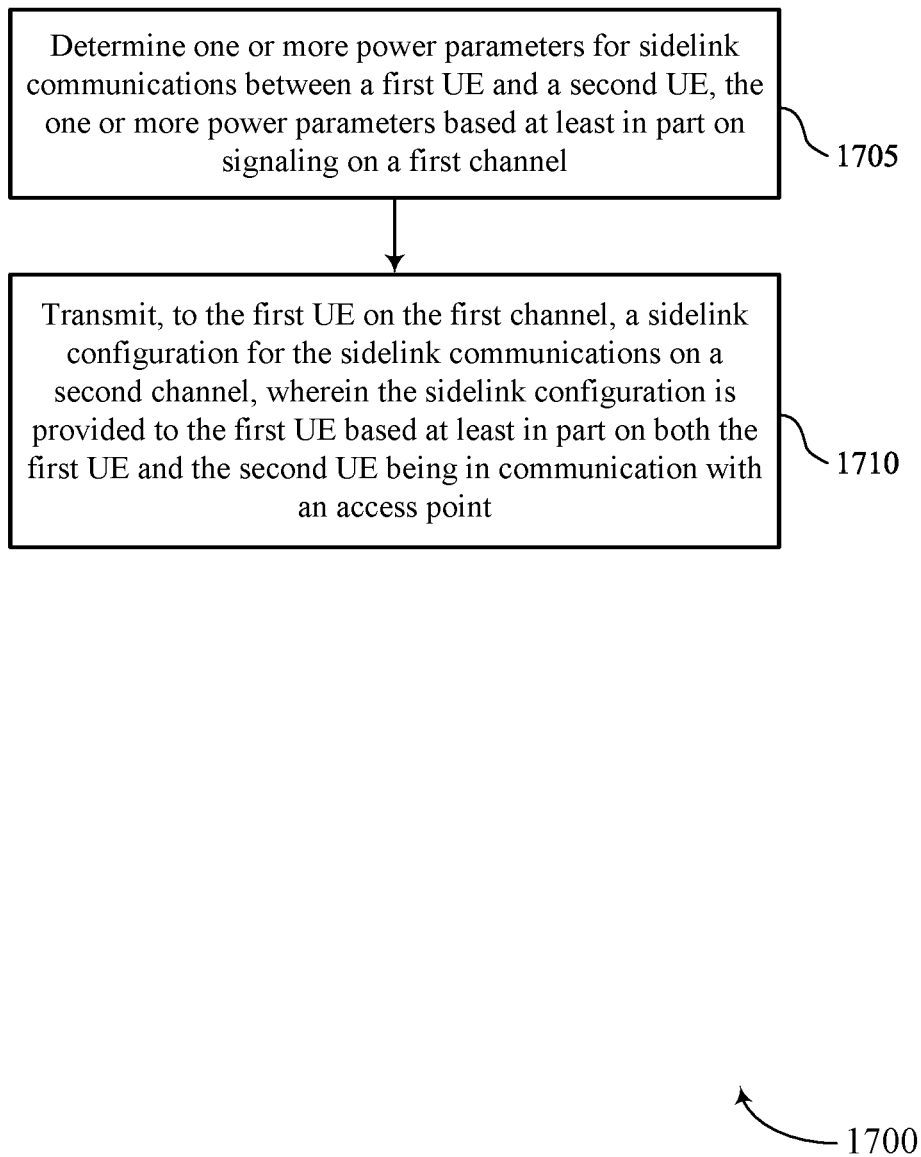

FIG. 17 shows a flowchart illustrating a method 1700 that supports access point assisted sidelink communications in accordance with aspects of the present disclosure. The operations of the method 1700 may be implemented by an AP or its components as described herein. For example, the operations of the method 1700 may be performed by an AP 106 as described with reference to FIGS. 1 through 5, and 10 through 13. In some examples, an AP may execute a set of instructions to control the functional elements of the AP to perform the described functions. Additionally or alternatively, the AP may perform aspects of the described functions using special-purpose hardware.

At 1705, the method may include determining one or more power parameters for sidelink communications between a first UE and a second UE, the one or more power parameters based on signaling on a first channel. The operations of 1705 may be performed in accordance with examples as disclosed herein. In some examples, aspects of the operations of 1705 may be performed by a power parameter component 1225 as described with reference to FIG. 12.

At 1710, the method may include transmitting, to the first UE on the first channel, a sidelink configuration for the sidelink communications on a second channel, where the sidelink configuration is provided to the first UE based on both the first UE and the second UE being in communication with an access point. The operations of 1710 may be performed in accordance with examples as disclosed herein. In some examples, aspects of the operations of 1710 may be performed by a sidelink configuration manager 1230 as described with reference to FIG. 12.

Figure 18:
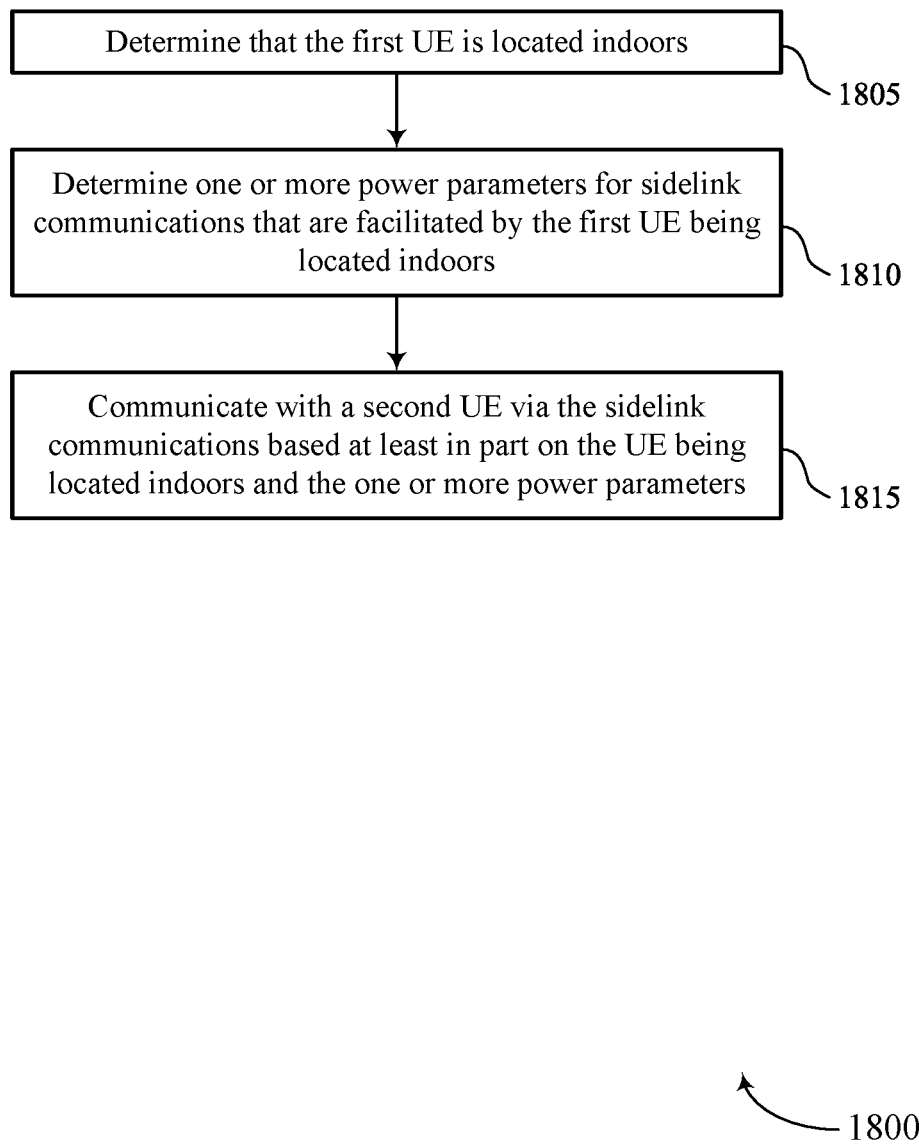

FIG. 18 shows a flowchart illustrating a method 1800 that supports access point assisted sidelink communications in accordance with aspects of the present disclosure. The operations of the method 1800 may be implemented by a UE or its components as described herein. For example, the operations of the method 1800 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1805, the method may include determining that the first UE is located indoors. The operations of 1805 may be performed in accordance with examples as disclosed herein. In some examples, aspects of the operations of 1805 may be performed by a location manager 840 as described with reference to FIG. 8.

At 1810, the method may include determining one or more power parameters for sidelink communications that are facilitated by the first UE being located indoors. The operations of 1810 may be performed in accordance with examples as disclosed herein. In some examples, aspects of the operations of 1810 may be performed by a power parameter manager 830 as described with reference to FIG. 8.

At 1815, the method may include communicating with a second UE via the sidelink communications based on the UE being located indoors and the one or more power parameters. The operations of 1815 may be performed in accordance with examples as disclosed herein. In some examples, aspects of the operations of 1815 may be performed by a sidelink communication component 835 as described with reference to FIG. 8.

Figure 19:
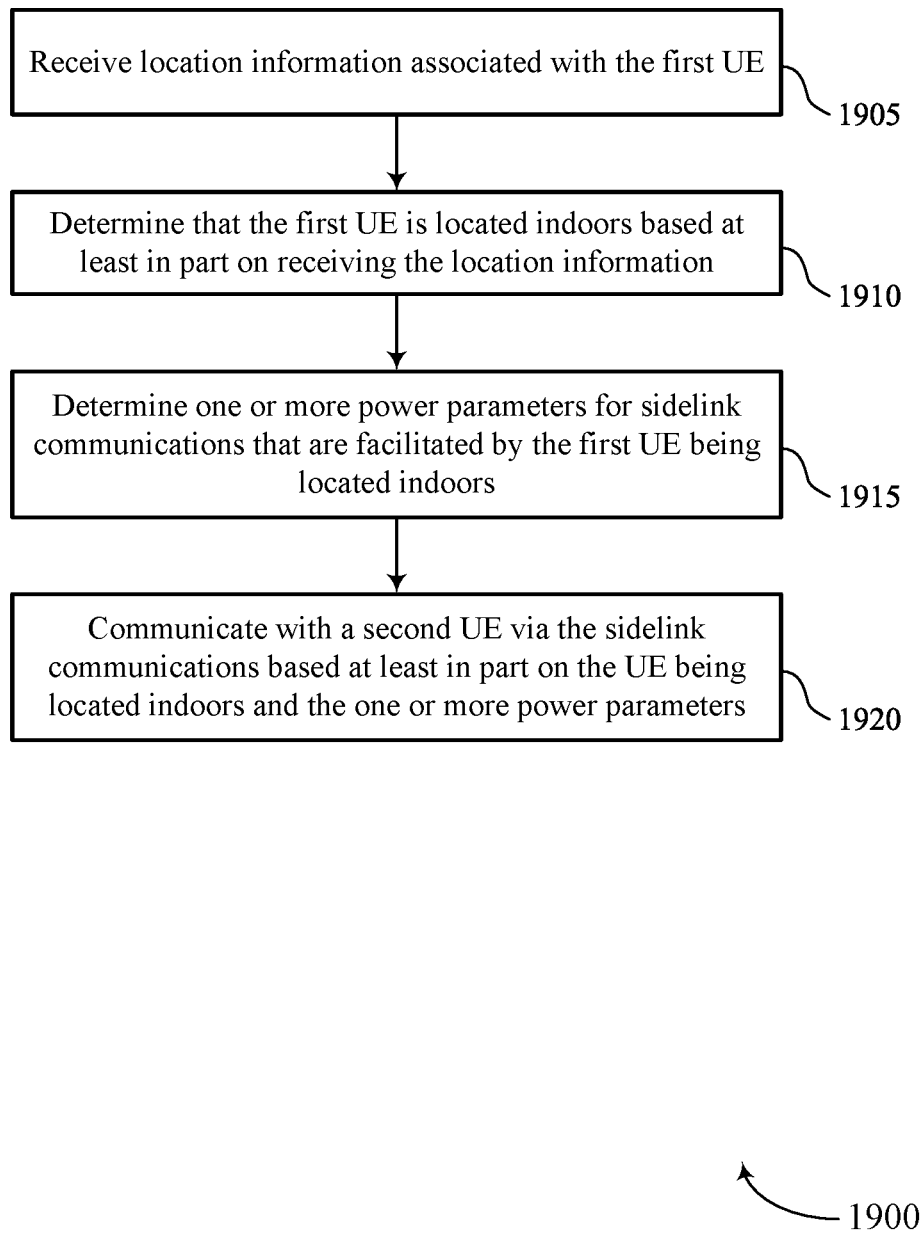

FIG. 19 shows a flowchart illustrating a method 1900 that supports access point assisted sidelink communications in accordance with aspects of the present disclosure. The operations of the method 1900 may be implemented by a UE or its components as described herein. For example, the operations of the method 1900 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1905, the method may include receiving location information associated with the first UE. The operations of 1905 may be performed in accordance with examples as disclosed herein. In some examples, aspects of the operations of 1905 may be performed by a location manager 840 as described with reference to FIG. 8.

At 1910, the method may include determining that the first UE is located indoors based on receiving the location information. The operations of 1910 may be performed in accordance with examples as disclosed herein. In some examples, aspects of the operations of 1910 may be performed by a location manager 840 as described with reference to FIG. 8.

At 1915, the method may include determining one or more power parameters for sidelink communications that are facilitated by the first UE being located indoors. The operations of 1915 may be performed in accordance with examples as disclosed herein. In some examples, aspects of the operations of 1915 may be performed by a power parameter manager 830 as described with reference to FIG. 8.

At 1920, the method may include communicating with a second UE via the sidelink communications based on the UE being located indoors and the one or more power parameters. The operations of 1920 may be performed in accordance with examples as disclosed herein. In some examples, aspects of the operations of 1920 may be performed by a sidelink communication component 835 as described with reference to FIG. 8.

The following provides an overview of aspects of the present disclosure:

Aspect 1: A method for wireless communications at a first UE, comprising: receiving, from a first access point on a first channel, a sidelink configuration for sidelink communications with a second UE on a second channel, wherein the sidelink configuration is provided to the first UE based at least in part on both the first UE and the second UE being in communication with an access point; determining one or more power parameters from the sidelink configuration, the one or more power parameters being for the sidelink communications and being based at least in part on signaling on the first channel; and communicating with the second UE on the second channel in accordance with the sidelink configuration.

Aspect 2: The method of aspect 1, further comprising: receiving one or more signals from the first access point, wherein the sidelink configuration is received based at least in part on receiving the one or more signals, and wherein the signaling on the first channel comprises the one or more signals.

Aspect 3: The method of aspect 2, wherein the one or more signals comprise an anchor signal, a synchronization signal block, a reference signal, or any combination thereof.

Aspect 4: The method of any of aspects 1 through 3, further comprising: transmitting one or more reference signals to the first access point, wherein the sidelink configuration is received based at least in part on transmitting the one or more reference signals, and wherein the signaling on the first channel comprises the one or more reference signals.

Aspect 5: The method of any of aspects 1 through 4, further comprising: determining a first operation mode for communications with the first access point and a second operation mode for the sidelink communications, wherein communicating with the second UE on the second channel is in accordance with the second operation mode.

Aspect 6: The method of aspect 5, wherein each of the first operation mode and the second operation mode comprises a standard power mode or a low power indoor mode.

Aspect 7: The method of any of aspects 1 through 6, wherein the one or more power parameters comprise a power spectral density of the sidelink communications, an equivalent isotropic radiated power of the sidelink communications, or both.

Aspect 8: The method of any of aspects 1 through 7, wherein the first channel and the second channel comprise a same channel.

Aspect 9: The method of any of aspects 1 through 7, wherein the first channel is different from the second channel.

Aspect 10: The method of any of aspects 1 through 9, wherein the first channel and the second channel are in a same radio frequency spectrum band.

Aspect 11: The method of any of aspects 1 through 9, wherein the first channel is in a first radio frequency spectrum band and the second channel is in a second radio frequency spectrum band.

Aspect 12: A method for wireless communications at a first access point, comprising: determining one or more power parameters for sidelink communications between a first UE and a second UE, the one or more power parameters based at least in part on signaling on a first channel; and transmitting, to the first UE on the first channel, a sidelink configuration for the sidelink communications on a second channel, wherein the sidelink configuration is provided to the first UE based at least in part on both the first UE and the second UE being in communication with an access point.

Aspect 13: The method of aspect 12, further comprising: transmitting one or more signals to the first UE, wherein the one or more power parameters are determined based at least in part on transmitting the one or more signals, and wherein the signaling on the first channel comprises the one or more signals.

Aspect 14: The method of aspect 13, wherein the one or more signals comprise an anchor signal, a synchronization signal block, a reference signal, or any combination thereof.

Aspect 15: The method of any of aspects 12 through 14, further comprising: receiving one or more reference signals from the first UE, wherein the one or more power parameters are determined based at least in part on receiving the one or more reference signals, and wherein the signaling on the first channel comprises the one or more reference signals.

Aspect 16: The method of any of aspects 12 through 15, further comprising: determining a first operation mode for communications with the first UE and a second operation mode for the sidelink communications, wherein communicating with the first UE on the first channel is in accordance with the first operation mode.

Aspect 17: The method of aspect 16, wherein each of the first operation mode and the second operation mode comprises a standard power mode or a low power indoor mode.

Aspect 18: The method of any of aspects 12 through 17, wherein the one or more power parameters comprise a power spectral density of the sidelink communications, an equivalent isotropic radiated power of the sidelink communications, or both.

Aspect 19: The method of any of aspects 12 through 18, wherein the first channel and the second channel comprise a same channel.

Aspect 20: The method of any of aspects 12 through 18, wherein the first channel is different from the second channel.

Aspect 21: The method of any of aspects 12 through 20, wherein the first channel and the second channel are in a same radio frequency spectrum band.

Aspect 22: The method of any of aspects 12 through 20, wherein the first channel is in a first radio frequency spectrum band and the second channel is in a second radio frequency spectrum band.

Aspect 23: A method for wireless communications at a first UE, comprising: determining that the first UE is located indoors; determining one or more power parameters for sidelink communications that are facilitated by the first UE being located indoors; and communicating with a second UE via the sidelink communications based at least in part on the UE being located indoors and the one or more power parameters.

Aspect 24: The method of aspect 23, further comprising: receiving location information associated with the first UE, wherein determining that the first UE is located indoors is based at least in part on receiving the location information.

Aspect 25: The method of aspect 24, wherein the location information is received from one or more sensors, one or more actuators, or any combination thereof.

Aspect 26: The method of any of aspects 24 through 25, wherein the location information comprises ultra wideband positioning information, a configuration, a setting, or any combination thereof.

Aspect 27: The method of any of aspects 23 through 26, further comprising: determining an operation mode for the sidelink communications, wherein communicating with the second UE is in accordance with the operation mode.

Aspect 28: The method of aspect 27, wherein the operation mode comprises a standard power mode or a low power indoor mode.

Aspect 29: The method of any of aspects 23 through 28, wherein the one or more power parameters comprise a power spectral density of the sidelink communications, an equivalent isotropic radiated power of the sidelink communications, or both.

Aspect 30: An apparatus for wireless communications at a first UE, comprising a processor; memory coupled with the processor; and instructions stored in the memory and executable by the processor to cause the apparatus to perform a method of any of aspects 1 through 11.

Aspect 31: An apparatus for wireless communications at a first UE, comprising at least one means for performing a method of any of aspects 1 through 11.

Aspect 32: A non-transitory computer-readable medium storing code for wireless communications at a first UE, the code comprising instructions executable by a processor to perform a method of any of aspects 1 through 11.

Aspect 33: An apparatus for wireless communications at a first access point, comprising a processor; memory coupled with the processor; and instructions stored in the memory and executable by the processor to cause the apparatus to perform a method of any of aspects 12 through 22.

Aspect 34: An apparatus for wireless communications at a first access point, comprising at least one means for performing a method of any of aspects 12 through 22.

Aspect 35: A non-transitory computer-readable medium storing code for wireless communications at a first access point, the code comprising instructions executable by a processor to perform a method of any of aspects 12 through 22.

Aspect 36: An apparatus for wireless communications at a first UE, comprising a processor; memory coupled with the processor; and instructions stored in the memory and executable by the processor to cause the apparatus to perform a method of any of aspects 23 through 29.

Aspect 37: An apparatus for wireless communications at a first UE, comprising at least one means for performing a method of any of aspects 23 through 29.

Aspect 38: A non-transitory computer-readable medium storing code for wireless communications at a first UE, the code comprising instructions executable by a processor to perform a method of any of aspects 23 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:
    transmitting one or more reference signals to a first access point;
    receiving, from the first access point on a first channel and based at least in part on transmitting the one or more reference signals, a sidelink configuration for sidelink communications with a second UE on a second channel, wherein the sidelink configuration is received based at least in part on both the first UE and the second UE being in communication with an access point, wherein the first channel and the second channel comprise a same channel, and wherein communications with the first access point are associated with a first operation mode and the sidelink communications are associated with a second operation mode; and
    communicating with the second UE on the second channel in accordance with one or more power parameters from the sidelink configuration and further in accordance with the second operation mode, the one or more power parameters being for the sidelink communications and being based at least in part on signaling on the first channel, wherein the signaling on the first channel comprises the one or more reference signals.

2. The method of claim 1, further comprising:
    receiving one or more signals from the first access point, wherein the sidelink configuration is received based at least in part on receiving the one or more signals, and wherein the signaling on the first channel comprises the one or more signals.

3. The method of claim 2, wherein the one or more signals comprise an anchor signal, a synchronization signal block, a reference signal, or any combination thereof.

4. The method of claim 1, wherein each of the first operation mode and the second operation mode comprises a standard power mode or a low power indoor mode.

5. The method of claim 1, wherein the one or more power parameters comprise a power spectral density of the sidelink communications, an equivalent isotropic radiated power of the sidelink communications, or both.

6. The method of claim 1, wherein the first channel and the second channel are in a same radio frequency spectrum band.

7. A method for wireless communications at a first access point, comprising:
    receiving one or more reference signals from a first user equipment (UE);
    determining, based at least in part on receiving the one or more reference signals, one or more power parameters for sidelink communications between the first UE and a second UE, the one or more power parameters based at least in part on signaling on a first channel, wherein communications with the first UE are associated with a first operation mode and the sidelink communications are associated with a second operation mode and wherein the signaling on the first channel comprises the one or more reference signals; and
    transmitting, to the first UE on the first channel, a sidelink configuration for the sidelink communications on a second channel in accordance with the first operation mode, wherein the sidelink configuration is transmitted to the first UE based at least in part on both the first UE and the second UE being in communication with an access point and wherein the first channel and the second channel comprise a same channel.

8. The method of claim 7, further comprising:
    transmitting one or more signals to the first UE, wherein the one or more power parameters are determined based at least in part on transmitting the one or more signals, and wherein the signaling on the first channel comprises the one or more signals.

9. The method of claim 8, wherein the one or more signals comprise an anchor signal, a synchronization signal block, a reference signal, or any combination thereof.

10. The method of claim 7, wherein each of the first operation mode and the second operation mode comprises a standard power mode or a low power indoor mode.

11. The method of claim 7, wherein the one or more power parameters comprise a power spectral density of the sidelink communications, an equivalent isotropic radiated power of the sidelink communications, or both.

12. The method of claim 7, wherein the first channel and the second channel are in a same radio frequency spectrum band.

13. The method of claim 7, wherein the first channel is in a first radio frequency spectrum band and the second channel is in a second radio frequency spectrum band.

14. A method for wireless communications at a first user equipment (UE), comprising:
    receiving location information associated with the first UE;
    determining that the first UE is located indoors based at least in part on receiving the location information;
    determining one or more power parameters for sidelink communications that are facilitated by the first UE being located indoors, wherein the one or more power parameters comprise a power spectral density of the sidelink communications, an equivalent isotropic radiated power of the sidelink communications, or both; and
    communicating with a second UE via the sidelink communications based at least in part on determining that the first UE is located indoors and the one or more power parameters.

15. The method of claim 14, wherein the location information is received from one or more sensors, one or more actuators, or any combination thereof.

16. The method of claim 14, wherein the location information comprises ultra wideband positioning information, a configuration, a setting, or any combination thereof.

17. The method of claim 14, further comprising:
    determining an operation mode for the sidelink communications, wherein communicating with the second UE is in accordance with the operation mode.

18. The method of claim 17, wherein the operation mode comprises a standard power mode or a low power indoor mode.

19. An apparatus for wireless communications at a first user equipment (UE), comprising:
one or more processors;
memory coupled with the one or more processors; and
instructions stored in the memory and executable by the one or more processors to cause the apparatus to:
transmit one or more reference signals to a first access point;
receive, from the first access point on a first channel and based at least in part on transmitting the one or more reference signals, a sidelink configuration for sidelink communications with a second UE on a second channel, wherein the sidelink configuration is received based at least in part on both the first UE and the second UE being in communication with an access point and wherein the first channel and the second channel comprise a same channel, and wherein communications with the first access point are associated with a first operation mode and sidelink communications are associated with a second operation mode; and
communicate with the second UE on the second channel in accordance with one or more power parameters from the sidelink configuration and further in accordance with the second operation mode, the one or more power parameters being for the sidelink communications and being based at least in part on signaling on the first channel, wherein the signaling on the first channel comprises the one or more reference signals.

* * * * *